United States Patent [19]

Thompson et al.

[11] Patent Number: 5,740,857
[45] Date of Patent: Apr. 21, 1998

[54] HEAT RECOVERY AND STORAGE SYSTEM

[76] Inventors: John G. Thompson, P.O. Box 1236, Orange, Va. 22960; Wilfred L. Harris, Jr., 12129 Hidden Lakes, Culpeper, Va. 22701-3728

[21] Appl. No.: 373,029

[22] Filed: Jan. 17, 1995

[51] Int. Cl.$^6$ ............................. F28D 7/10; F24H 1/12
[52] U.S. Cl. ...................... 165/47; 165/154; 165/909
[58] Field of Search ........................ 165/47, 154, 909

[56] References Cited

U.S. PATENT DOCUMENTS

| | | | |
|---|---|---|---|
| 2,047,757 | 7/1936 | Welch | 165/154 |
| 3,802,499 | 4/1974 | Garcea | 165/154 |
| 4,256,170 | 3/1981 | Crump | 165/154 |
| 4,304,292 | 12/1981 | Cardone et al. | 165/47 |
| 4,352,391 | 10/1982 | Jonsson | 165/47 |
| 4,619,311 | 10/1986 | Vasile et al. | 165/47 |
| 5,287,913 | 2/1994 | Dunning et al. | 165/154 |

FOREIGN PATENT DOCUMENTS

| | | | |
|---|---|---|---|
| 3932871 | 2/1990 | Germany | 165/47 |
| 167464 | 2/1934 | Switzerland | 165/154 |
| WO8907230 | 8/1989 | WIPO | 165/154 |

*Primary Examiner*—John K. Ford
*Attorney, Agent, or Firm*—Sheldon H. Parker

[57] ABSTRACT

This invention for use with a water-using system is directed to a heat recovery and storage device adapted to recover heat from warm waste liquid and transfer it to cooler supply water where the flows of both waste liquid and supply water are intermittent and not necessarily contemporaneous, and to store the warmed supply water until required for use. This invention comprises an internal high-thermal-conductivity waste liquid transmission pipe enclosed by a low-thermal-conductivity supply water reservoir pipe, the ends of the resulting storage reservoir being enclosed by end-plates incorporating an inlet and a discharge coupling means for installing the device into the waste liquid pipe of a building in place of a section of that pipe, the inlet and outlet coupling being so aligned that the internal surfaces of the waste liquid pipe from the building, the inlet coupling, the heat recovery and storage device's internal waste liquid transmission pipe, the outlet coupling, and the waste liquid outlet pipe to the waste disposal means, respectively are aligned without obstruction so that the waste liquid flow is not impeded. The endplates may also be adapted to accommodate other pipes, such as that leading to the condenser of an airconditioner, from which heat may be transferred to the supply water. A cool supply water injection means is disposed in the lower portion of the reservoir and a tapping means for warmed supply water is disposed in the upper portion thereof.

21 Claims, 10 Drawing Sheets

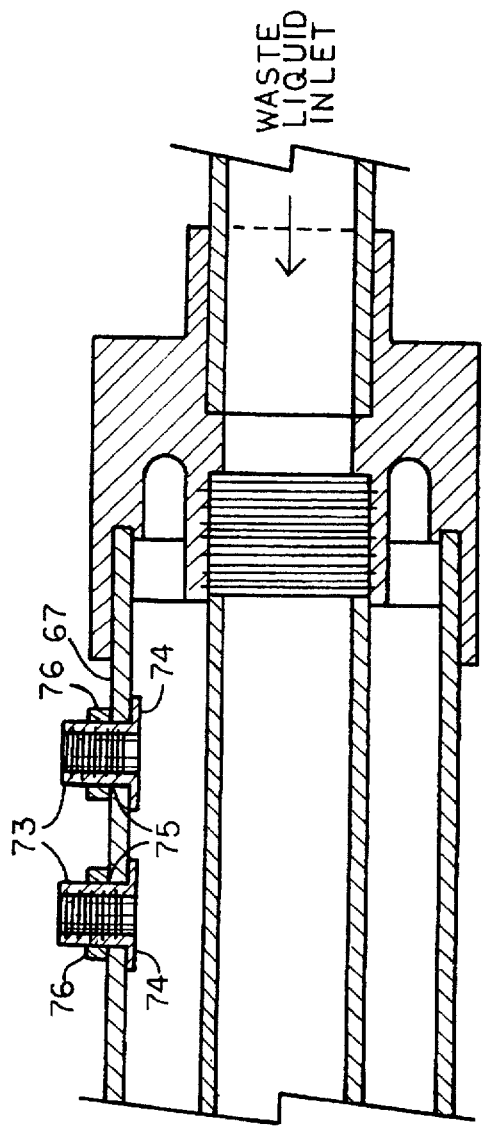
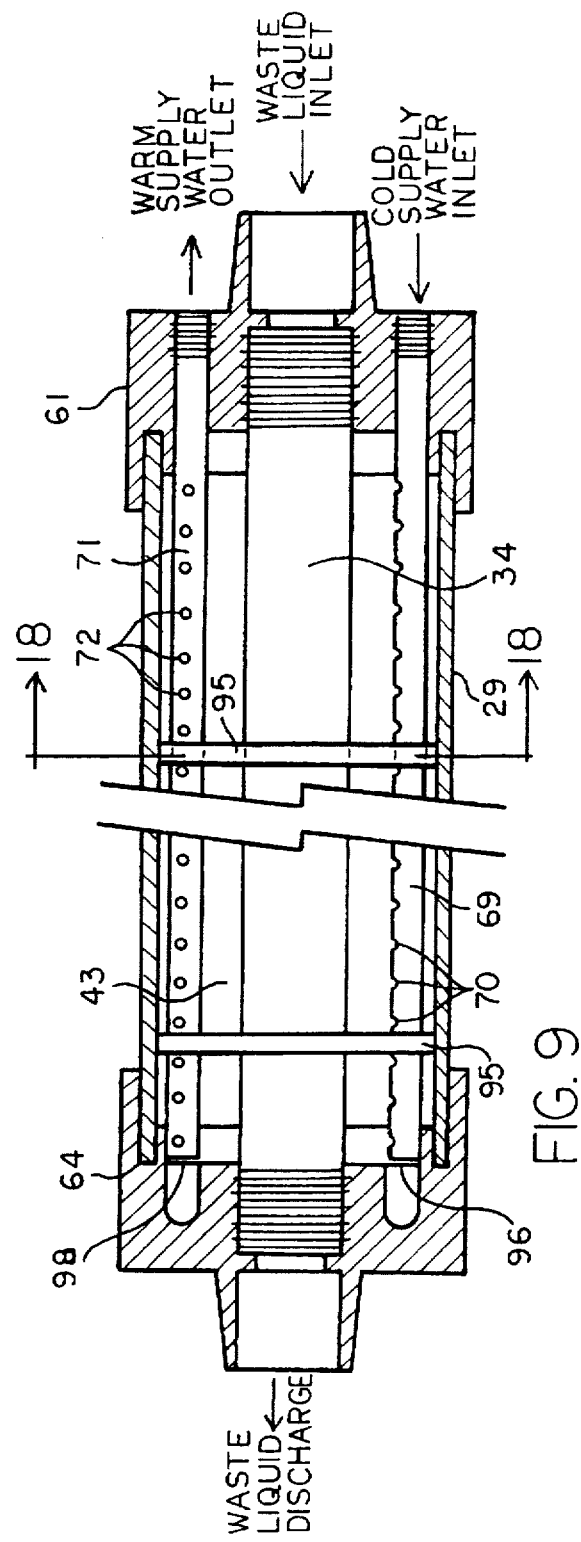

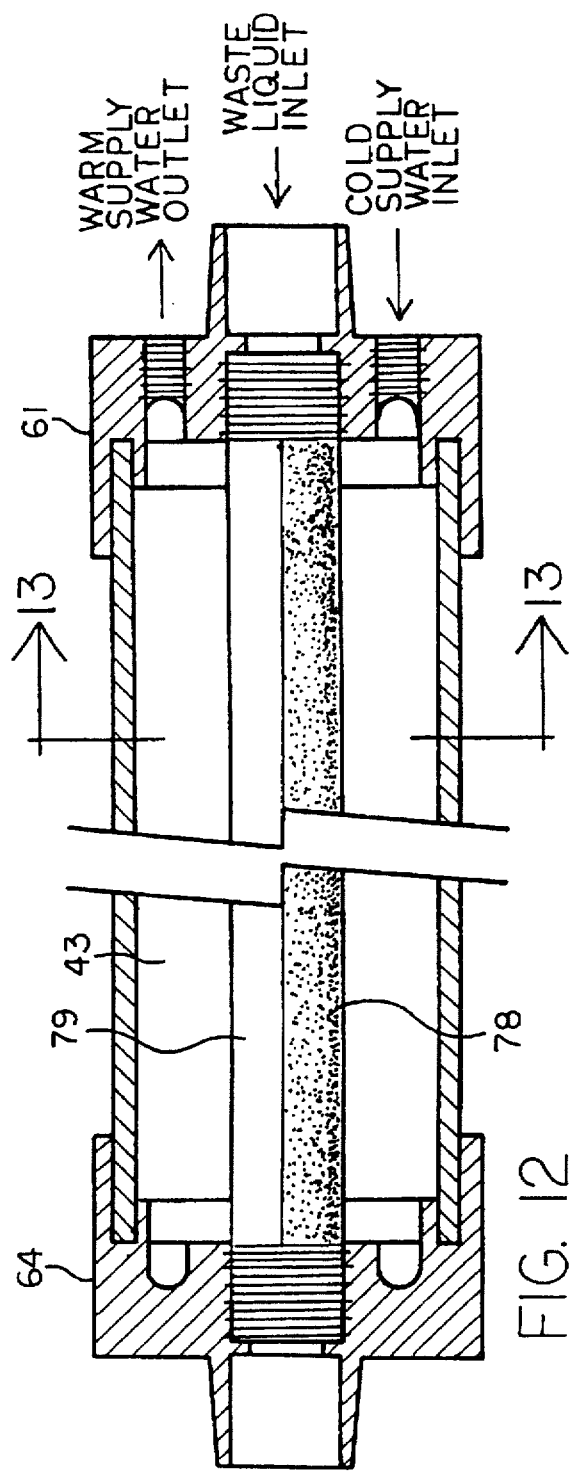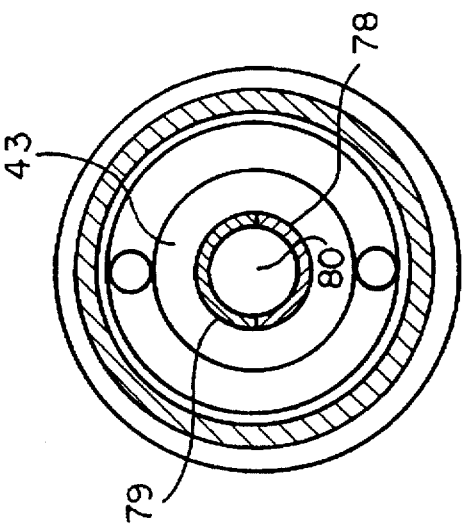

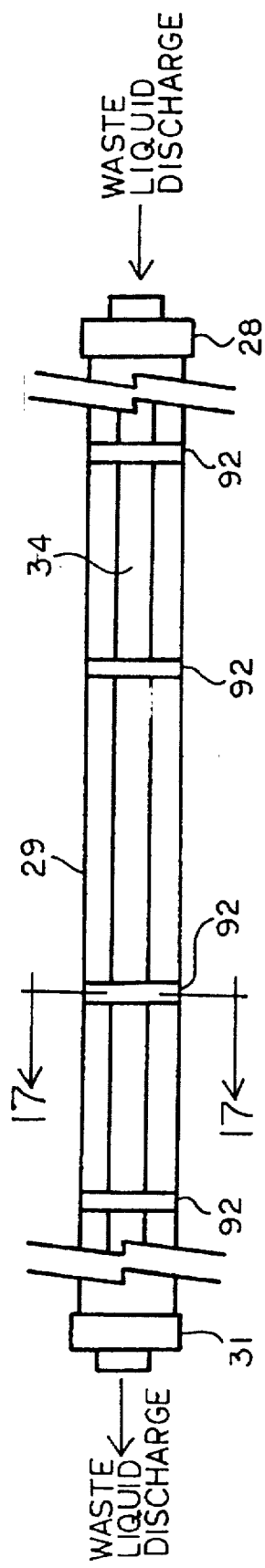
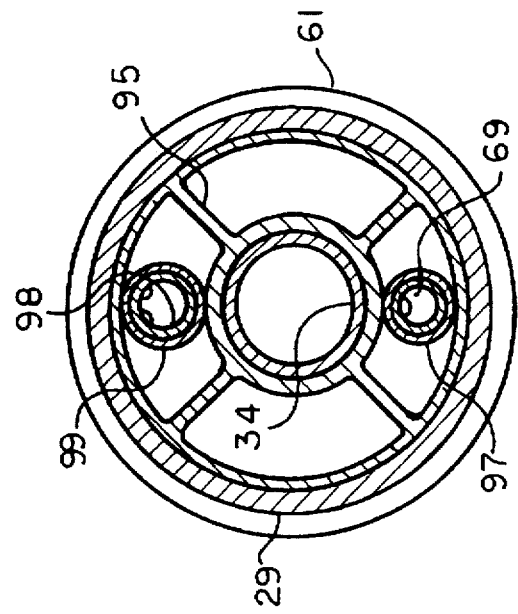
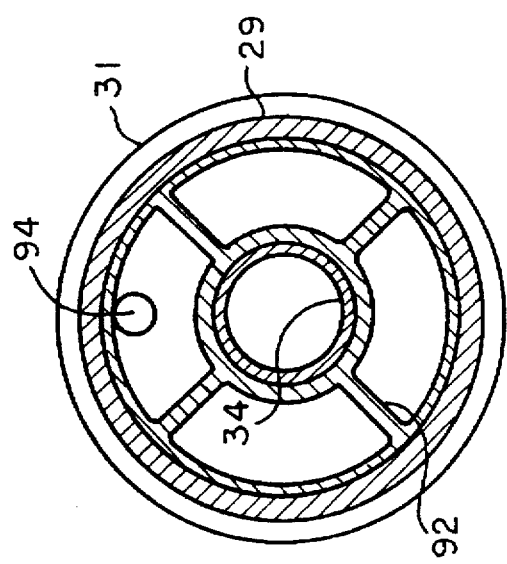

HEAT RECOVERY AND STORAGE SYSTEM

BACKGROUND OF THE INVENTION

1. Field of the Invention

The present invention generally relates to an apparatus useful in a water-using system for transferring heat from waste liquid to supply water. Embodiments of the present invention are particularly adapted for preheating the cold supply water of individual residences and multiple-residential and commercial buildings by recovering heat from the warm waste liquid that intermittently flows out through their sewer pipes.

2. Description of the Background of the Invention

For individual residences and other residential and commercial buildings the temperature of the incoming water supply commonly lies in the range of 45 degrees F. in winter through 75 degrees F. in summer. In the case of residences and other buildings receiving their water from their own wells, the temperature of the incoming water supply commonly remains fairly constant at about 55 degrees F. However, residences and other buildings commonly have installed within them appliances and other facilities that require for their operation the heating of the supply water to temperatures of, for example, up to 115 degrees F. for showers and bathtubs to 150 degrees F. or more for clothes- and dish-washers. The effluent from these appliances and facilities consists of water containing waste materials, the mixture being referred to herein as waste liquid, and, as it passes out through the sewer pipes, retains much of the heat that has been added. It is an object of this invention to transfer a useful amount of this heat to the supply water before the supply water enters the heating devices connected to the respective appliances and facilities of the residence or other building, so that supply water enters any particular heating device at a higher temperature than in the absence of such heat transfer, with the result that the rise in supply water temperature required to be effected by the heating device is smaller, and that the energy input to the heating device and consequent energy costs are reduced.

The flow of the waste liquid from individual residences and from many other buildings is, however, intermittent. This is in contrast to that from the many commercial and industrial processes which are operated continuously due to their profit-earning nature, whereas domestic appliances are operated as and when convenient. An example is the contrast of the commercial laundry to the domestic clothes-washing machine. The former may be expected to produce a continuous flow of heated waste liquid throughout the working day, while the latter produces short-duration flows of heated waste liquid possibly only a few times in a week. This invention is directed toward the transfer of heat from intermittently-flowing heated waste liquid to pressurized supply water which is constantly available. In residences and other buildings, and even in many commercial operations, it is commonly not economical, given the present low cost of fresh supply water, to recycle the water component of the waste liquid, by separating the water from its suspended or dissolved substances. The waste liquid is therefore discharged to an external waste liquid disposal means, where any residual heat is dissipated. In the example of a residence this disposal means may be an individual septic tank or public sewerage system. For reasons of hygiene and to prevent clogging by deposition of suspended solids the sewer pipes are installed to allow the waste liquid to run through them as quickly as economically possible. The waste liquid therefore cannot be pressurized or restrained in its sewer pipe, but must discharge to atmospheric pressure. This in turn means that the waste liquid passes quickly through the section of sewer that is available to a heat extraction apparatus and does not fill commonly more than half the cross-section of the sewer pipe, so that the opportunity for the optimum efficiency of heat transfer achieved by conventional heat exchangers by prolonging the heat transferring contact between the warm waste liquid and the heat transmitting surfaces is denied. It also means that a heat recovery device economical for use in these conditions of intermittent flow, where the amount of heat extracted from each flow of waste liquid is low, must be cost effective to manufacture and install. It must also be capable of installation so that no obstructions which might cause clogging are presented to the flow of waste liquid. In addition, since the demand for warmed supply water particularly in residential applications is also intermittent, the heat recovery device must provide, as in this present invention, storage for the supply water into which the heat has been recovered. This invention is directed towards low manufacturing and installation costs, insulated storage of pre-warmed supply water, and to non-clogging operation. This invention is also readily adapted to extract heat from appliances that employ recycled coolants, where the heat would otherwise be dissipated and wasted. An example of such an appliance is an airconditioner where the refrigerant line leading to the condenser could dissipate the heat extracted from the air-conditioned structure into the supply water reservoir.

Several other patents have been granted for inventions intended to extract heat from waste liquids, but none so far adapted for the particular residential or intermittent commercial applications of this present invention, which teaches a heat recovery and storage device inexpensive to manufacture and install, capable of working where waste liquid flows and demands for supply water are intermittent, non-contemporaneous, and of short duration. For example, U.S. Pat. No. 4,256,170, issued to Crump, and No. 4,502,529, issued to Varney, both teach heat exchangers adapted for extracting heat from waste liquid. However, Crump is particularly indicated for use with commercial dishwashers and washing machines, or other high-temperature continuous-flow machines. Crump, Column 1, lines 10–11, 23–24. Crump also employs serpentine passageways for the supply water, more suited to continuous, rather than intermittent, hot waste liquid flow, which do not appear to evidence the low manufacturing cost and light weight which make the present invention particularly suitable for residential use. Crump, Column 1 at 41–49. In addition, the passageways in Crump, which are intended to guide the flow of supply water, would inhibit the supply water convection which is a novel feature of the present invention in that such convection enables optimum heat transfer particularly from intermittent and fast-moving flows of waste liquid.

Varney, on the other hand, teaches a section of waste pipe composed partly of a coiled supply water pipe, resulting in a corrugated internal surface for the waste pipe, which might tend to trap suspended solids in the waste liquid and thereby cause at least surface clogging which would reduce heat transfer efficiency, when used for waste liquids of that type. Varney, FIG. 2. Varney also, in contrast with the present invention, has a low reservoir capacity for storage of the pre-warmed supply water and a comparatively low heat transfer contact area between the waste liquid and the supply water, emphasized by the fact that the waste liquid, as noted above, and in Crump, cannot fill the waste pipe where the waste liquid is not recycled. Varney, Column 1, lines 31–32. In addition, neither Crump nor Varney teaches the heat recovery from refrigerant recycling appliances such as airconditioners that is readily available in the present invention.

Neither Crump nor Varney teach in their respective heat exchanger the present invention's outer casing made of low-thermal-conductivity material which retains in the supply water the heat recovered from the waste liquid while the supply water is being stored in the supply water reservoir pipe awaiting demand by an appliance and keeps to a low rate the conduction of recovered heat to the atmosphere and also the back-conduction of heat through the outer casing wall from the warmed supply water in the upper portion of the outer casing, which is tapped for use by appliances on demand desirably at as high a temperature as possible, to the cold supply water in the lower portion.

With energy costs constantly subject to increase due to inflation, international crises, and environmental concerns, the present invention fulfills a long-felt need for a inexpensive, durable, and effective method of recovering heat that is currently being dissipated uselessly. The large number of patents granted for waste liquid heat recovery, without the lack of complexity, cheapness of manufacture and installation, and the ability to extract and store heat from small intermittent flows of waste liquid of the present invention indicates the desirable utility, novelty, and nonobviousness thereof.

SUMMARY OF THE INVENTION

The present invention provides a new and improved apparatus, to be used for a hot-water-using system, for transferring heat from waste liquid to the cooler supply water. The invention is also adapted for transferring to the system's supply water waste heat from refrigerant-recycling devices, such as airconditioners.

The apparatus according to the present invention consists essentially of a heat recovery and storage device adapted to transfer heat from warm waste liquid to cooler supply water where the flows of warm waste liquid and the demands for warmed supply water are intermittent and are generally not contemporaneous. That is, for the purposes of the system served by this invention, for example a house with various hot-water-using appliances, the supply water is likely to be under more or less constant pressure and held static for long periods, while the waste liquid is discharged intermittently as quickly as possible under atmospheric pressure to a waste disposal means not forming part of this invention.

The heat recovery and storage device according to this invention is designed to be inserted as part of the waste liquid pipeline leading from the hot-water-using system to the waste disposal means. In the modern residence, to be used as an example for the purpose of this Summary, the waste liquid pipeline is made of thermoplastic material and runs from appliances, such as a washing machine, dishwasher, shower and bathtubs, between or below the joists of the ceiling of the basement or crawl space, to an external septic tank or public sewer. In a preferred embodiment, this invention replaces or forms part of the waste liquid pipeline suspended from or otherwise affixed to the residential structure. The waste liquid is transmitted through the heat recovery and storage device of this invention by a pipe, known herein as the waste liquid transmission pipe, of the same cross-section as the waste liquid outlet pipe of the hot-water-using system, and made of high-thermalconductivity material, such as copper. Since the waste liquid is discharged to atmospheric pressure, it does not commonly fill the pipeline, and therefore in one embodiment of this invention the lower portion of the waste liquid transmission pipe is made of high-thermal-conductivity material and the upper portion, infrequently in contact with the warm waste liquid, is made of material, such as a rigid plastic, which has the benefit of limiting re-conduction of heat from the warmed supply water awaiting demand to the unwarmed entry supply water.

At each end of the waste liquid transmission pipe is a liquid tight coupling means for coupling the waste liquid transmission pipe into the waste pipeline, and for accommodating the expansion and contraction of the transmission pipe under its intermittent contact with warm waste liquid. That is, the inlet coupling couples the waste liquid transmission pipe to the waste liquid outlet pipe of the residence, and the outlet coupling couples the waste liquid transmission pipe to the waste liquid discharge pipe which is to take the waste liquid to the external waste disposal means. The couplings are so made and arranged that the internal surfaces of the waste liquid outlet pipe, the inlet coupling, the waste liquid transmission pipe, the outlet coupling, and the waste liquid discharge pipe, are respectively coupled together so that little or no protrusion, ridge or other obstruction is presented to impede the flow of the waste liquid through the whole assembly. Around the exterior of, and attached in liquid-tight fashion to each coupling is an endplate the outer periphery of which is designed to make a liquid proof joint with a pipe of larger diameter than the waste transmission pipe and made of a low-thermal-conductivity and low-cost material such as a thermoplastic material, which may be flexible to assist in accommodating the expansion and contraction of the waste liquid transmission pipe. This larger diameter pipe, herein referred to as the supply water reservoir pipe, forms the longitudinal wall of the outer casing of the supply water reservoir of the recovery and storage device of this invention. In order for the outer casing of the heat recovery and storage device of this invention to withstand the pressure of the supply water without leakage or bursting, the couplings, the endplates, the waste transmission pipe, and the supply water reservoir pipe, are so constructed and dimensioned that the liquid tight joint between each coupling and its respective end of the waste liquid transmission pipe is effective in conjunction with the liquid tight joint between the corresponding end of the supply water reservoir pipe and its respective endplate. In one preferred embodiment, this is achieved by the use of male threads at the ends of the waste liquid transmission pipe and tapered peripheral coupling rims on the endplates which in this embodiment are made of flexible material to accommodate the expansion and contraction of the waste transmission pipe resulting from the intermittent flow of warm waste liquid, both endplates being employed with a conventional flexible sealing compound, so that as the couplings are screwed on to the ends of the waste liquid transmission pipe until its ends butt tightly against the internal peripheral shoulders of the respective couplings the tapered rims of the endplates are tightened on to the ends of the supply water reservoir pipe, and the sealing compound then sets permanently but flexibly in the joints. In another preferred embodiment the ends of the waste liquid transmission pipe and the internal openings of the endplates into which they are inserted are left unthreaded, and are affixed together by means of interposed stepped flexible bushings affixed and sealed by conventional flexible sealing compound, the flexible bushings in this embodiment accommodating the expansion and contraction.

Another type of stress that must be accommodated by the assembled components of the heat recovery and storage device of this invention is that arising from the expansion and contraction of the waste liquid transmission pipe as a result of the intermittent flows of warm waste liquid through it. Since the warm waste liquid when flowing through the waste liquid transmission pipe occupies only the lower portion thereof, the lower portion of the wall will be raised and lowered in temperature to a greater extent than the upper portion, and consequently will expand and contract to a greater degree respectively in the presence and absence of warm waste liquid, thereby tending to flex the pipe, and place alternating stress on the joints and other components of the assembly. In the case of copper, a preferred material for the waste liquid transmission pipe, the expected expansion and contraction for the temperature ranges of waste liquid encountered in the residential applications for which this invention is particularly adapted is calculated to be of the order of three-sixteenths of an inch over the approximately ten foot length of a typical heat recovery and storage device according to this invention. In the preferred embodiment described above in which the waste liquid transmission pipe and the endplates are threaded and screwed together, the alternating stress of the expansion and contraction of the waste liquid transmission pipe is accommodated by making the endplates of a flexible moldable material. In the alternative preferred embodiment described above where the ends of the waste liquid transmission pipe and the internal openings of the endplates into which they are inserted are left unthreaded, flexible annular stepped bushings are arranged between the respective ends of the waste liquid transmission pipe and the internal endplate openings to accommodate the alternating stress, the bushings being affixed to the pipe and to the endplates by sealing compound.

Since the length of the heat recovery and storage device according to this invention for single family residential use would be about ten feet and the overall diameter would be less than ten inches, in the preferred embodiment pipe supports for the waste liquid transmission pipe and other internal pipes is provided by a plurality of radial pipe support frames bearing on the internal surface of the supply water reservoir pipe, in order to prevent sagging or flexing or other asymmetrical movement of the internal pipes, particularly under conditions of expansion and contraction caused by the intermittent flows of warm waste liquid, which might affect the liquid tightness of the sealed joints of the device.

It has been found by experiment that because of the intermittency of the flow of waste liquid and its rapid passage through the waste liquid transmission pipe, heat is most advantageously transferred overall by arranging the existence of as great as possible a temperature difference between the supply water and the waste liquid. Accordingly supply water is injected into the reservoir space between the waste liquid transmission pipe and the supply water reservoir pipe through an injection means in the lower portion of the reservoir. In one preferred embodiment the injection means is a pipe disposed in liquid-tight fashion through the wall of the supply water reservoir pipe near the lowest position available adjacent to the end plate bearing the waste liquid inlet coupling. In another preferred embodiment of this invention the injection means is a pipe disposed in liquid-tight fashion through lower portion of the endplate bearing the inlet coupling.

Since, as is well known, the supply water warmed by contact with the waste liquid transmission pipe will tend to flow by convection to the upper portion of the supply water reservoir the warmed supply water is tapped from the reservoir by tapping means disposed through the upper portion of the supply water reservoir pipe, proximal to the endplate bearing the waste liquid outlet coupling. It has been found by experiment that the highest overall temperature of supply water to be sent to the water heater serving the appliances is obtained by tapping water from several positions along the uppermost surface of the supply water reservoir pipe. In one preferred embodiment this is achieved by use of several pipes disposed in liquid-tight fashion through the uppermost portion of the supply water reservoir pipe and centered along the line there parallel to the axis of the supply water reservoir pipe. In another preferred embodiment, this multiple tapping is achieved by insertion, in liquid-tight fashion through the uppermost available portion of the endplate bearing the outlet coupling, of a pipe parallel to the axis of the supply water reservoir pipe and bearing a plurality of holes for water to enter along its length into the supply water reservoir pipe.

This invention will also transfer the heat from refrigerant recycling systems the operation of which requires the disposal of heat, as in an airconditioning system, for example. In such an embodiment a tube commonly made of high-thermal-conductivity material and containing the recycling fluid from which heat is to be transferred is disposed in external liquid-tight fashion through one endplate of the invention, through the supply water reservoir, and through the other endplate respectively. Available heat will then pass through the high-thermal-conductivity walls of the tube into the supply water reservoir.

In another preferred embodiment of this invention, for installations where the ambient atmospheric temperature is higher than the inlet temperature of the supply water, the upper portion of the outer wall of the supply water reservoir pipe is externally insulated to retain the heat in the warmed supply water that has migrated to the upper part of the reservoir, while the uninsulated lower portion allows heat to enter the lower, cooler water from the surroundings. In installations where undesirable condensation might occur on the external surface of the lower portion, due to its temperature being lower than that of its surroundings, insulation may be arranged to cover the entire external surface of the heat recovery and storage device according to this invention. These and other meritorious features of the present invention will be more fully appreciated from the following description and claims.

BRIEF DESCRIPTION OF THE DRAWINGS

FIG. 8 is a sectional view of part of FIG. 7 taken on the line 8—8 showing a preferred mode of arranging one of the plurality of warmed supply water tapping means pipe connections through the wall of the supply water reservoir pipe.

FIG. 9 is a sectional view as in FIG. 6 but showing an embodiment wherein the cool supply water injection means is a straight linear pipe disposed through the endplate bearing the waste liquid outlet coupling and extending substantially the full length of the supply water reservoir, said pipe having a plurality of openings disposed along its uppermost portion for distributing the cool supply water therethrough, and wherein the warmed supply water tapping means is a straight linear pipe disposed through the endplate bearing the waste liquid inlet coupling and extending substantially the full length of the supply water reservoir, said pipe having a plurality of openings in two lines disposed along its upper quadrant portions and centered on lines parallel to its axis. Also shown in FIG. 9 is a pipe support frame bearing on the circumference of the internal surface of the supply water reservoir pipe and supporting thereon the waste liquid transmission pipe and the supply water injection and tapping pipes.

FIG. 12 is a sectional view as in FIG. 3 but showing an embodiment in which the waste liquid transmission pipe of this invention is made with the lower portion of the pipe wall of high-thermal-conductivity material, while the upper portion is made of low-thermal-conductivity material such as thermoplastic.

FIG. 13 is a transverse cross-sectional view of the embodiment shown in FIG. 12, taken on the line 13—13.

FIG. 16 shows a part axial section of the heat recovery and storage device according to this invention arranged with radial support frames for the waste liquid transmission pipe, the support frames extending between its outer surface and the internal surface of the supply water reservoir pipe, in respective planes normal to the common axis of the pipes.

FIG. 17 shows a transverse cross section of a support frame of FIG. 16, taken on line 17—17.

FIG. 18 shows a transverse cross section of a support frame of FIG. 9 taken on line 18—18, having a similar function to the support frame of FIG. 17, but so constructed as to accommodate the supply water injection and tapping means shown in FIG. 9.

DETAILED DESCRIPTION OF THE PREFERRED EMBODIMENT

Figure 1:
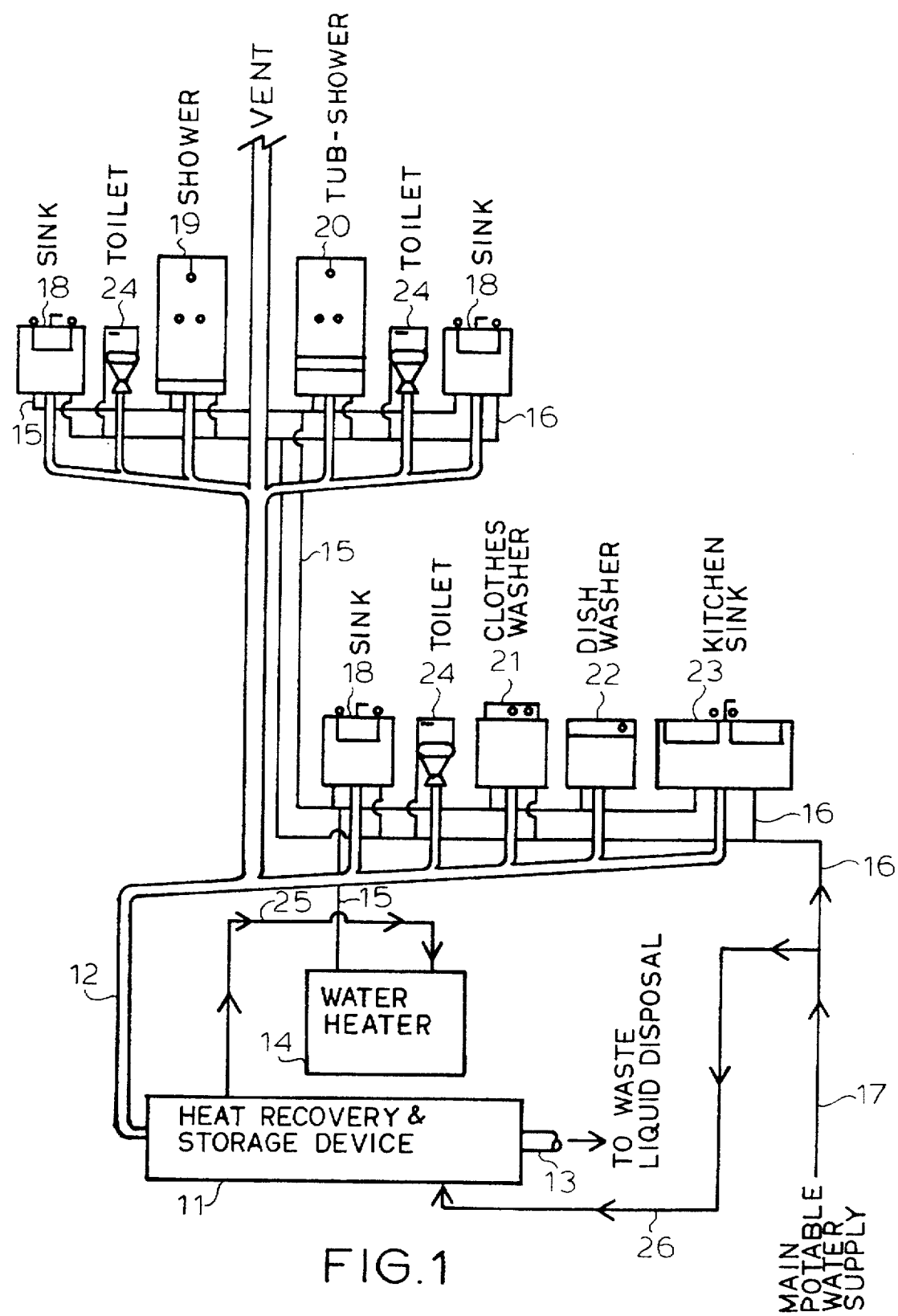
FIG. 1 is an exemplary schematic illustration showing the heat recovery and storage system according to this invention connected to a water-using system, being in this case a residence having various domestic water-using appliances.

This invention relates to a heat recovery and storage system adapted for transferring heat from warm waste liquid to cooler supply water for reducing energy costs in a hot-water-using system.

The heat recovery and storage device of this present invention is designed to be inexpensive to manufacture as compared with the heat exchangers already known in the art, easy to install, light in weight, extremely durable, and require no maintenance. It is therefore suitable for installation in single-family residences, where its ability to raise the input temperature of water supplied to water heaters by extracting heat from the intermittent flows of waste liquid from showers, bathtubs, and appliances such as clothes washers and dishwashers make it particularly useful in reducing energy costs. The single family residence will therefore be used in this description as a convenient example of the type of hot-water-using system for which the invention is most useful. However, the choice of that example is not to be taken as a restriction or limitation on the use of this invention. The invention is capable of adaptation in size, shape and the combination of materials from which it may be manufactured, for use in any application, residential, industrial, governmental, or commercial where heat is available to be extracted from intermittent flows or discharges of waste liquid.

A typical single family residence contains several appliances and facilities that use hot water, usually supplied by a common water-heater, and that discharge waste liquid at temperatures higher than that of the supply water entering the heater. Such appliances and facilities include a dishwasher, a clothes washer, showers, various sinks, and bathtubs. Up to the present, in almost all cases the warm waste liquid is not recycled but is discharged through a pipeline to a septic tank or other disposal site where the heat available in the waste liquid is dissipated uselessly, remote from the residence. It may be that waste liquid from such appliances and facilities will be recycled in means associated closely with the residence to a limited extent for example for use in flushing toilet commodes; however, the recycling process is unlikely to use, but rather dissipate, the waste liquid's retained heat. It is to be understood in this description that references to waste disposal means include references to such waste liquid recycling means, as well as septic tanks and public sewerage purification plants. It is the object of this invention to recover heat from the warm waste liquid before it is discharged to the waste disposal means, and so transfer the heat into the supply water feeding the heater which in turn provides hot water for the residences various appliances and facilities. In this way the difference in temperature through which the heater must raise the supply water for effective operation of the residences appliances and facilities will be reduced. Consequently the amount of energy used by the heater and the overall energy cost will be reduced. Obviously, it is advantageous to achieve this saving in cost for as little capital expenditure as possible, and this requires the cost of purchase and installation of the means for recovering and transferring the waste liquid heat into the supply water to be as low as possible. This invention therefore relates to a heat recovery and storage device which is adapted to the intermittent nature of residential use, and is inexpensive to manufacture and install.

From a single family residence, the waste liquid is commonly discharged by gravity, that is, through a sloping discharge pipe to a waste disposal means. The discharge pipe is vented to the atmosphere to avoid return to the residence of noxious waste gases from the disposal means. Therefore the waste liquid is discharged at atmospheric pressure, and so does not fill the cross-section of the discharge pipe. At the same time, concerns for hygiene require that the waste liquid travel through the discharge pipe as quickly as economically possible, and the discharge pipe is installed with as little or no internal obstructions and with a certain slope, commonly about 2.5 inches fall in ten feet of pipe. These flow characteristics respectively tend to reduce the heat exchange surface available and to limit the time in which heat may be transferred from the waste liquid. In addition, the flow of waste liquid from the residence's appliances and facilities is intermittent and irregular, because it arises from usage when convenient, in contrast with a water-using commercial or industrial installation where the plant is kept in operation continuously due to its profit-earning nature. In a commercial or industrial installation the temperature of the waste liquid is likely to be higher than that from residential use. The heat recovery and storage device to be used in recovery of heat from residential waste liquid must therefore be able to work with small volumes of warm water, available intermittently for short periods of time. Accordingly the heat recovery and storage device of this invention has as a principal element a waste liquid transmission pipe through which the waste liquid flows with little or no obstruction, and which is installed in effect as part of the waste liquid discharge pipeline, by means of obstruction-free couplings. The waste liquid transmission pipe is made of a high-thermal-conductivity material such as copper, to transfer as high a proportion of the heat available from each particular discharge of waste liquid as it flows rapidly through.

By contrast the supply water in the supply line of the plumbing system in a residence is commonly at entry to the system between 45 and 75 degrees F. and under a pressure in the supply piping of up to 100 psi. Consequently the supply water is available to surround the waste liquid transmission pipe when retained within the supply water reservoir of this invention. In the heat recovery and storage device according to this invention the outer casing comprises a length of pipe of a low-thermal-conductivity material such as thermoplastic closed at each end by an endplate of similar material, the endplate incorporating the respective coupling of the waste liquid transmission pipe. The space between the waste transmission pipe and the outer casing provides a reservoir for supply water, into which the heat passing through the high-thermal-conductivity wall of the waste liquid transmission pipe is absorbed, thereby raising the temperature of the supply water, particularly in the intervals when no supply water is being drawn, the usage of supply water being intermittent. The low thermal-conductivity of the supply water reservoir pipe tends to prevent the heat absorbed by the supply water in the reservoir from escaping into the surroundings of the device, and reduces thermal conduction from portions of the reservoir pipe in contact with warmed supply water to portions in contact with cold supply water, thus maintaining a higher temperature difference between cool supply water and warm waste liquid and thereby greater efficiency of operation. It is a particularly novel feature of this invention that the supply water reservoir pipe, or shell as it is known in the art, is manufactured of a material of low-thermal-conductivity, thus distinguishing this invention from that of Crump, for example, which consists of a heat exchanger entirely of metal, depending on additional outside insulation to conserve the recovered heat, and allowing the heat recovered into the supply water to be readily conducted throughout the heat exchanger, in turn making the temperature difference between cool supply water and warm waste liquid smaller and the operation of Crump's device less efficient.

Experiments with the heat recovery and storage device according to this invention have shown that the position of the means for injecting supply water into the reservoir should be through the lowest area of the supply water reservoir pipe at any point along its length to achieve the largest rise in temperature of the supply water tapped from the reservoir, but the location of the supply water injection means along the length of the supply water reservoir pipe does not significantly alter the supply water's temperature increase. A particularly novel feature of the present invention, contrary to the heat exchangers taught by Crump and Varney, for example, is the combination of supply water injection and tapping means and the arrangement of the waste liquid transmission pipe and supply water reservoir pipe which permits migration of the warmed supply water by convection to the upper portion of the reservoir from which it is tapped. Therefore the injection of cold supply water and the tapping of warmed supply water are arranged as described herein in order to minimize turbulence which would impede convection in the supply water reservoir.

In the modern residence there may be appliances which are not water-using, but which generate or collect waste heat that must be disposed of in order for such appliances to continue to operate. An example of such an appliance is a central airconditioning system. Heat from the residence is collected by the airconditioner in fluid that is circulated through heat-disposal means outside the residence. The disposal means may, for example, be a condenser using the external atmosphere or a subterranean heat sink. This otherwise wasted heat may be recovered by the heat recovery and storage device according to the present invention, to effect further economic benefits, in that the airconditioner's heat-bearing fluid may be passed in a pipe made of high-thermal-conductivity material through this invention's supply water reservoir, located between the waste liquid transmission pipe and the supply water reservoir pipe.

Referring to the embodiments of this invention as shown in the drawings, FIG. 1 schematically illustrates the heat recovery and storage device according to this invention installed for use with an exemplary system representing that of a single family residence, without in any way implying that the use of the heat recovery and storage device of this invention is restricted to such use. In FIG. 1, heat recovery and storage device 11 according to this invention is coupled to and between the waste liquid outlet pipe 12 of the residence and the waste liquid discharge pipe 13, so that all the waste liquid from the residence flows through heat recovery and storage device 11, and then through the waste liquid discharge pipe 13 to the waste liquid disposal means, which may be for example a public sewage treatment plant or a septic tank. In the system shown in FIG. 1, there are various appliances and facilities installed which receive for the purpose of their intended operations hot supply water from water heater 14 through hot water pipes 15 and cold supply water through cold supply water pipes 16 from the water source 17 for the residence, a source which may be a well commonly supplying water at about 55 degrees F. or a water main supplying water in the temperature range 45 to 75 degrees F. depending on the ambient temperatures in the different seasons of the year. The appliances and facilities shown in FIG. 1 that receive such hot and cold water are sinks 18, a shower 19, a bathtub with shower 20, a clothes washer 21, a dishwasher 22, and a kitchen sink 23. The waste liquid, warmed above the temperature of the cold supply water by the admixture in each respective appliance or facility of water, preheated by the heat recovery and storage device 11 and further heated by water heater 14, flows intermittently according to use into the waste liquid outlet pipe 12, and thence through the heat recovery and storage device 11. Toilets 24 receive for their operation only cold water through cold supply water pipes 16. The economy of plumbing in a residence commonly dictates that the waste liquid from toilets flows into the same waste liquid outlet pipe 12 as that from the other appliances and facilities, but, as the waste liquid from toilets is no colder than the cold supply water to which the heat recovery and storage device 11 is intended to transfer heat from the waste liquid, the toilets' effluent will tend not to reabsorb a significant amount of heat back from the supply water in the heat recovery and storage device at the time of toilet waste liquid discharge. Whether or not it may be economical for the effluent from toilets to by-pass the heat recovery and storage device depends on the locations of the toilets in the system, relative to each other and to the heat recovery and storage device. Hot water pipes 15 receive their hot supply water from water heater 14, which in turn receives its supply water from warmed supply water pipe 25 which taps its water from the supply water reservoir, as described hereinafter, of the heat recovery and storage device 11, which in turn receives cold supply water through cold water pipe 26 from the cold water supply source 17. From the foregoing description of the connection of the heat recovery and storage device 11 according to this invention to the residence system it can be seen that both warm waste liquid and cold supply water flow through the heat recovery and storage device 11 and that heat is therefore transferred to the cold supply water, raising its temperature above that of the cold supply water which would, if there were no heat recovery and storage device 11, enter the water heater 14 directly through cold water supply pipe 16 from source 17. The temperature range through which the water heater 14 must raise the supply water is therefore reduced, and therefore the water heater's energy input and the cost thereof are correspondingly reduced. This reduction in cost represents a return on the investment made in the purchase and installation of heat recovery and storage device 11.

Figure 2:
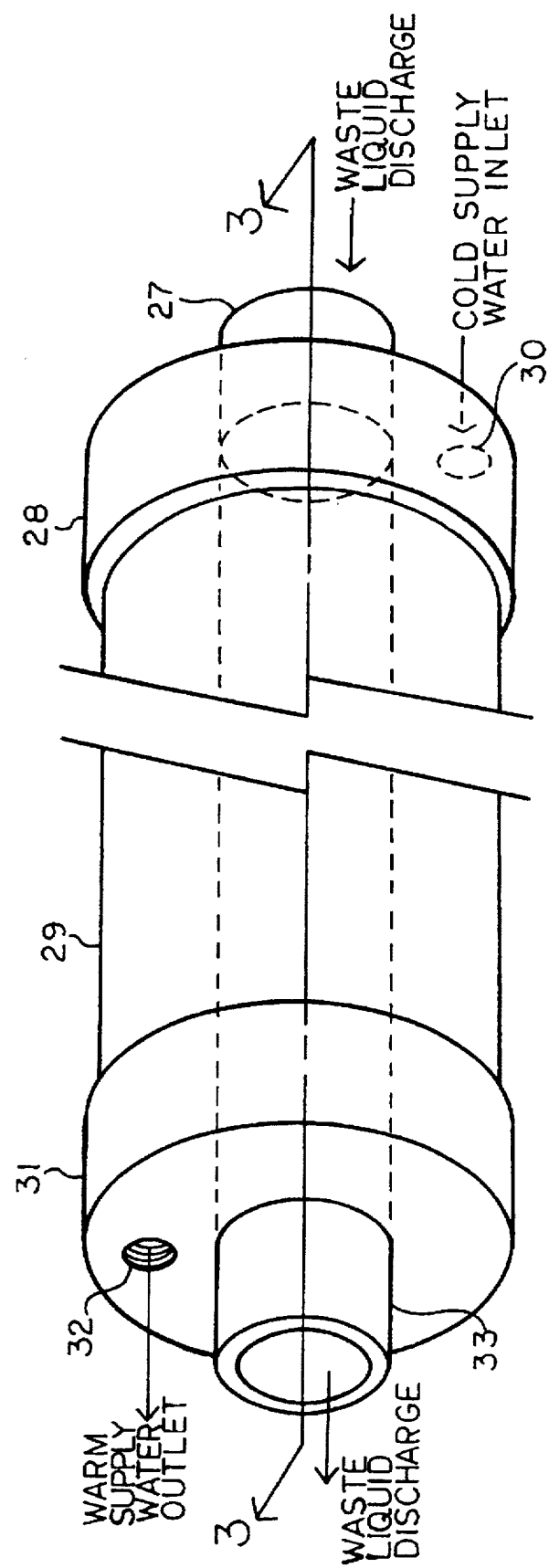
FIG. 2 is an isometric view of the preferred embodiment of the heat recovery and storage device according to the present invention in which the cold supply water injection means is disposed through the endplate bearing the waste liquid inlet coupling and the warmed supply water tapping means is disposed through the endplate bearing the waste liquid outlet coupling.

FIG. 2 is an isometric view of the heat recovery and storage device according to a preferred embodiment of this invention showing waste liquid inlet coupling 27 which is employed to couple the heat recovery and storage device to, and axially in line with, the waste liquid outlet pipe 12 of FIG. 1. Waste liquid inlet coupling 27 may be manufactured of a moldable material, such as a thermoplastic, and is preferably made integral with endplate 28, also made of a material having a low thermal conductivity, such as a moldable thermoplastic. Inserted axially and affixed in liquid-tight fashion into inlet endplate 28, as described more particularly below, is a planar end of straight linear supply water reservoir pipe 29, said end being cut normal to the axis thereof and proximal to the waste liquid inlet of the present invention, said pipe 29 being manufactured of a low-thermal-conductivity material such as standard PVC or ABS water pipe, so that endplate 28 encloses the respective end of reservoir pipe 29 between the circumferential wall thereof and inlet coupling 27. Cold supply water injection means 30 is disposed through the lower portion of endplate 28 in a direction parallel to the axis of reservoir pipe 29, and provides the cold supply water connection to cold supply water pipe 26 of FIG. 1. Inserted and affixed in liquid-tight fashion into endplate 31, as described more particularly below, proximal to waste liquid discharge coupling 33, is an end of straight linear supply water reservoir pipe 29, said end being cut normal to the axis thereof and distal to the waste liquid inlet of the present invention, which is the waste outlet pipe 12 of the system in FIG. 1, so that endplate 31 encloses the distal end of reservoir pipe 29 between the circumferential wall thereof and waste liquid discharge coupling 33. Warmed supply water tapping means 32 is disposed through the upper portion of endplate 31 in a direction parallel to the axis of reservoir pipe 29, and provides the warmed supply water connection to warmed supply water pipe 25 of FIG. 1. Affixed to, or preferably molded into, endplate 31 is waste liquid outlet coupling 33 which is employed to couple the heat recovery and storage device to, and axially in line with, the waste liquid discharge pipe 13 of FIG. 1. Endplate 31 and outlet coupling 33 are made of a material of low thermal conductivity, such as a moldable thermoplastic, similarly to endplate 28 and inlet coupling 27 respectively.

Figure 3:
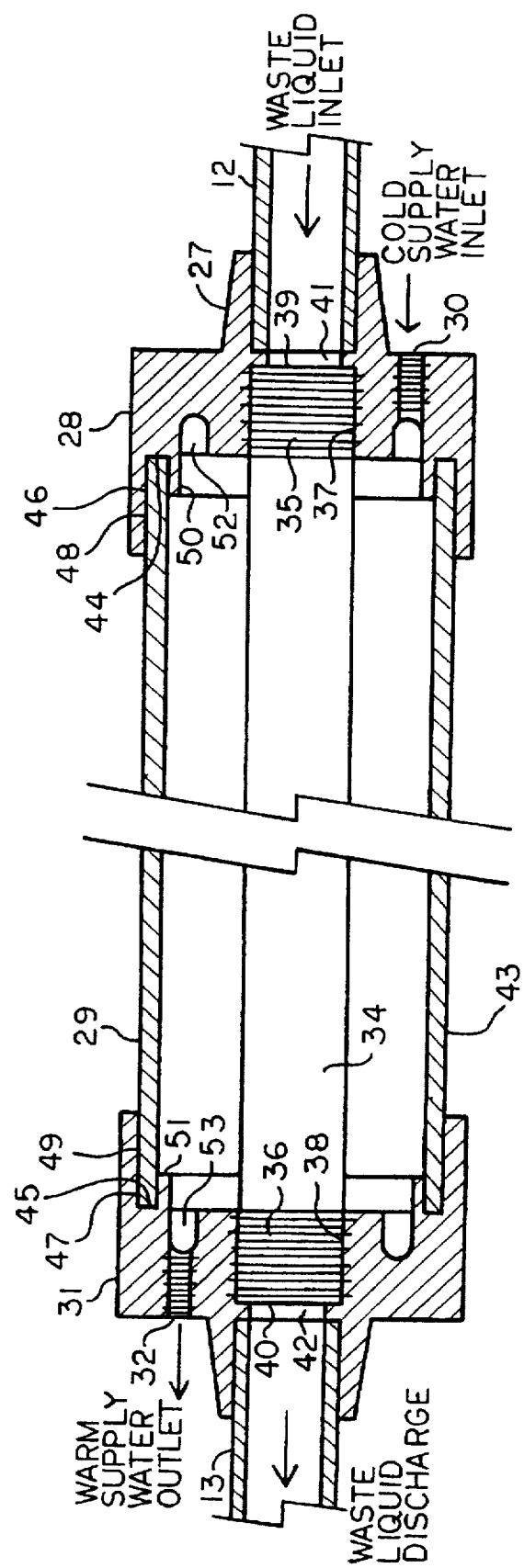
FIG. 3 is a sectional view of FIG. 2 taken on the line 3—3 therein, showing a preferred embodiment in which the endplates are affixed to their respective ends of the waste liquid transmission pipe by integral screw threads, and showing also the mode of coupling the heat recovery and storage device of this invention in the waste liquid pipeline.

FIG. 3 is a sectional view taken along the line 3—3 in FIG. 2, showing waste liquid transmission pipe 34 left unsectioned for clarity. Straight linear waste liquid transmission pipe 34 is made of high-thermal-conductivity material such as copper so that the heat in the waste liquid flowing therethrough is readily transferred transversely through transmission pipe 34 into the supply water reservoir that occupies the space between transmission pipe 34 and supply water reservoir pipe 29. Transmission pipe 34 may be aligned on the same axis as supply water reservoir pipe 29, or, with appropriate configuration of endplates 28 and 31 may be offset from such axis, for example to locate transmission pipe nearer to the cold supply water injection means 30 and to increase the volume of warmed supply water near to the warm supply water tapping means 32. However, to allow the waste liquid to flow as freely as possible and thereby minimize clogging possibilities, transmission pipe 34 must be installed in the same axis as the residence drain pipe portions 12 and 13 of FIG. 1. For installation on the same axis as water supply reservoir pipe 29, in the embodiment of the present invention shown in FIG. 3 transmission pipe 34 is provided with male screw threads 35 and 36 in the end portions of its outer surface which are screwed into corresponding female threads 37 and 38 respectively in endplates 28 and 31. When the heat recovery and storage device according to this invention has been fully assembled, male threads 35 and 36 are respectively screwed into female threads 37 and 38 so that the planar ends 39 and 40 of the waste transmission pipe 34, normal to the axis thereof, butt against annular shoulders 41 and 42 which are arranged transversely around the inside surfaces of couplings 27 and 33 respectively, shoulders 41 and 42 being of internal diameter equal to that of transmission pipe 34, which in turn is the same internal diameter as that of the residence drain pipe outlet and discharge portions 12 and 13 of FIG. 1. Thus it can be seen that little or no obstruction to the flow of waste liquid is presented by the coupling of waste transmission pipe 34 to said drain pipe portions 12 and 13. To secure the above-described screwed joints between transmission pipe 34 and endplates 28 and 31 permanently against leakage of waste liquid from inside transmission pipe 34 and leakage of supply water from the reservoir 43 located between transmission pipe 34 and supply water reservoir pipe 29, a suitable conventional adhesive or plumbers' putty is applied to the screw threads 35, 36, 37 and 38 before assembly. In the preferred embodiment shown in FIG. 3, the adhesive or putty should be of a type that remains permanently flexible, so as to maintain the liquid-tightness of the joints when the waste liquid transmission pipe expands and contracts in the presence and absence of warm waste liquid respectively, and the endplates 28 and 31 should be manufactured of a material flexible enough, such as moldable plastic, to accommodate the expansion and contraction.

Figure 10:
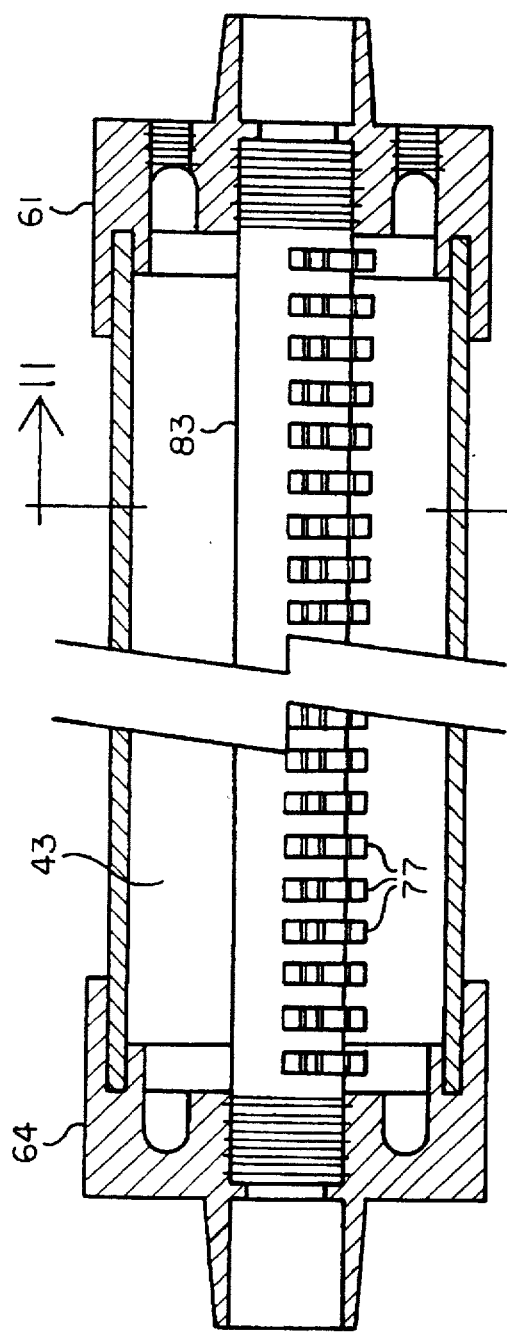
FIG. 10 is a sectional view as in FIG. 3 but showing an embodiment in which the waste liquid transmission pipe of FIGS. 3 through 9 of which the outside surface excluding the portions inserted in endplates is arranged with integral fins below the level of said pipe's centerline.
Figure 11:
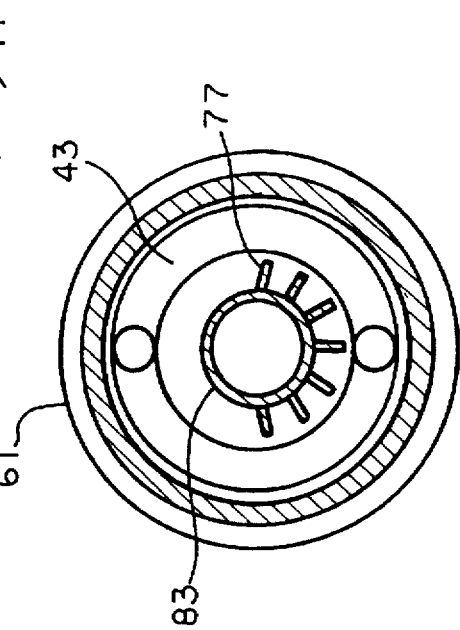
FIG. 11 is a transverse cross-sectional view of the embodiment shown in FIG. 10, taken on the line 11—11.

Since a greater length would increase costs of manufacture and installation and a shorter length would reduce the amount of heat recoverable from the waste liquid, it has been found by calculation and experiment that the overall length of the heat recovery and storage device 11 according to this invention when made suitable for installation in a typical single family residence is approximately ten feet, and is otherwise sized to fit where necessary between standard spaced structural elements, such as the ceiling joists of a basement or the floor joist above a crawl space. For example, for installation in a single family residence the supply water reservoir pipe 29 is a length of low-thermal-conductivity standard PVC or ABS pipe, such as schedule 40 PVC water supply pipe, with an internal diameter of 4 to 6 inches, and transversely cut to affix to the endplates 27 and 31 and of such a length that the overall length of the heat recovery and storage device is about ten feet. Depending upon energy costs of the system, the length of the heat recovery and storage device could be economically increased, or further devices could be installed in series, for additional heat recovery. Experiments have shown that a second pass of the waste liquid through a heat recovery and storage device of this invention in a typical residential installation can recover an additional amount of heat amounting to sixty percent of the heat recovered in the first pass. The waste water transmission pipe 34 in a residential installation is made of high-thermal-conductivity material preferably copper with an inner diameter of 2, 3, or 4 inches in order to equal that of the conventional drain pipe portions 12 and 13 of the particular residence. Depending upon the specific usage and related energy cost, and thus potential for saving energy costs, the waste liquid transmission pipe may have fins, spines, pins, or other additional heat recovery surfaces as shown in FIGS. 10 and 11, or may be a plain-surfaced pipe of a high-thermal-conductivity material such as copper, in order to maximize the transfer of heat from the waste liquid to the supply water. The couplings 27 and 33, illustrated in FIG. 3 as integral with endplates 28 and 31 respectively, have been shown in the drawings and described herein as standard push-fit gluable couplings suitable for the standard PVC or ABS thermoplastic drain pipe of which the conventional waste liquid outlet portion 12 and discharge portion 13 of the sewage pipe of the modern residence are commonly made. However, couplings 27 and 33 may be made of any form and size to suit the particular installation in which the heat recovery and storage device according to this invention is required, accompanied by appropriate sizing of the waste liquid transmission pipe to avoid clogging where the waste liquid carries with it solid matter.

As shown in FIG. 3, supply water reservoir pipe 29 is of such a length that when waste liquid transmission pipe 34 is screwed into endplates 28 and 31 so that its ends 39 and 40 butt against annular shoulders 41 and 42 respectively, the transverse-cut ends 44 and 45 of reservoir pipe 29 are located at or near the limit of annular grooves 46 and 47 in endplates 28 and 31 respectively. Annular grooves 46 and 47 are bounded by annular outer walls 48 and 49 and inner walls 50 and 51 respectively, the inner walls being about one-fourth the height of the outer walls, and the grooves 46 and 47 taper very slightly, narrower towards the innermost portion thereof, said tapering permitting escape of air when the ends of reservoir pipe 29 are inserted in the grooves, and to provide space for the conventional adhesive used to affix reservoir pipe 29 in the grooves and to provide annular liquid tight seals between endplates 28 and 31 and reservoir pipe 29, strong enough to withstand the expansive force against the endplates imposed by the pressure of the supply water in reservoir 43, and the stress caused by the aforesaid expansion and contraction of the waste liquid transmission pipe 34 under intermittent contact with warm waste liquid.

As can be seen in FIG. 3, endplates 28 and 31 have annular radiused recesses 52 and 53 disposed between the female threaded portions 37 and 38 and the inner walls 50 and 51. These recesses serve the purposes of permitting pressure of the supply water in reservoir 43 to tend to force inner walls 50 and 51 against the inner surface of supply water reservoir pipe 29 thus tending to improve the liquid-tightness and stability of each respective joint, of increasing the capacity of reservoir 43, of reducing the thickness of the section of the molding of the endplate for greater ease of molding, and of reducing weight. The annular recesses 52 and 53 are radiused at their ends within their respective endplates to effect a stronger construction than would be achieved with angular or rectangular ends.

The foregoing description of the preferred embodiment does not preclude the use of different or alternative means of assembling and respectively affixing together endplates 28 and 31, waste liquid transmission pipe 34, and supply water reservoir pipe 29, and effecting the respective liquid-tight seals between those elements, so as to construct the novel heat recovery and storage device according to this invention. For example, the outer walls 48 and 49 of endplates 28 and 31 respectively could be reduced in length or eliminated, and the inner walls 50 and 51 thereof increased in length, provided effective liquid-tight seals are obtained, in conjunction with the use of conventional adhesives or putty.

The novelty of this invention will be apparent from the mode of operation of the preferred embodiment of the heat recovery and storage device illustrated in FIGS. 2 and 3. In the water-using system of the typical residence schematically shown in FIG. 1, the appliances and facilities are used as and when convenient. This distinguishes the system from that contemplated in Crump, which is a commercial system where continuous operation is desirable for profitability. The supply water for a residence for which this present invention is adapted is kept at pressures within a certain range, which is commonly 30 to 70 psi, for example by a conventional pressure tank controlled by pressure switches or a public main water supply. The supply water injected by injection means 30 into reservoir 43 remains within that pressure range in the reservoir, perhaps dropping briefly slightly below if several appliances demand supply water simultaneously. Reservoir 43 is therefore full of supply water at all normal times, and the supply water remains in the reservoir until a demand on it is made by an appliance or facility. This continual reserve of supply water acts as a heat sink and storage for all heat conducted through the high-thermal-conductivity walls of the waste liquid transmission pipe. Moreover that heat tends, during periods of non-usage of supply water, to be retained within the reservoir by the low thermal conductivity of the walls of the supply water reservoir pipe 29 and endplates 28 and 31, until drawn off by a demand for supply water through supply water tapping means 32 into water heater 14 of FIG. 1, where the heat gained in reservoir 43 reduces the heat input required from water heater 14.

Since, as is well-known, the density of warm water is lower than that of cold water, the supply water in reservoir 43 warmed by transfer of heat from waste liquid transmission pipe 34 will convect toward the upper part of reservoir 43. Intermittent flows of supply water and waste liquid are accommodated by drawing warmed supply water from the upper portion of reservoir 43, allowing for maximum temperature difference between the cool supply water in the lower portion of reservoir 43 and the warmer waste liquid, thus resulting in greater heat gain. Since the advantage of this invention lies in its providing supply water to the water heater 14 at a higher temperature than is available direct from source 17 in FIG. 1, the tapping means 32 for drawing off supply water from reservoir 43 is located in the upper part of reservoir 43, and in FIG. 3 is shown as being disposed through endplate 31, it being easier, and therefore less expensive in manufacture, to tap through the flat external transverse surface of endplate 31 than, for example, through the curved upper wall of supply water reservoir pipe 29. As warmed supply water is drawn off via tapping means 32, cold supply water enters reservoir 43 via supply water injection means 30, and as this entering supply water is in its turn warmed by the heat transferred through the walls of waste liquid transmission pipe 34, it convects toward the upper portion of reservoir 43. The novel configuration of this present invention promotes convection which cannot exist in Crump, where the heat exchanger is designed for a continuous flow of hot waste liquid, and consequently of supply liquid which is directed by the force of its flow through passageways arranged around the heat transmitting waste pipe.

Referring again to FIG. 3 for describing the novel mode of operation of the present invention, the flow of warm waste liquid through the waste liquid transmission pipe is intermittent, according to the use and operation of the appliances and facilities installed in the system, which by their nature release the waste liquid suddenly, not in a gradual or continuous fashion. This suddenness of release, has two practical results; there is a reduced likelihood of deposition of solid matter in the drain pipe leading to the waste liquid disposal means, as compared with a slow release; and the waste liquid leaves the system quickly in the interests of hygiene. The slope with which the drain pipe is installed in the system aids both these advantageous features. However, since the drainage of waste water is down a slope and to atmospheric pressure, the drain pipes, and the waste liquid transmission pipe 34 of the present invention coupled into the drainage pipe, rarely if ever are filled with waste liquid over more than half of their cross-section. The problem in heat recovery is how to extract a worthwhile amount of heat from a warm waste liquid passing intermittently at high speed through the waste liquid transmission pipe 34. This is achieved in the novel heat recovery and storage device according to the present invention in two ways. First, the heat recovery and storage device is long in comparison to the diameter of the waste liquid transmission pipe consistent with economy of manufacture and installation; in practice the ratio of said length to diameter is about 30 to 60 to 1, so that the warm waste liquid stays in contact with the high-thermal-conductivity wall of the waste liquid transmission pipe 34 as long as feasible during its flow, and therefore has more heat transferring contact through the wall with the lower temperature supply water in the supply water reservoir 43 than if the length diameter ratio were lower. Here, it should be first pointed out that the waste liquid continuously discharged from commercial appliances to the heat exchanger taught by Crump would be at a higher temperature than in the residential installations largely contemplated for the present invention, whereas the intermittent flow of waste liquid for which the present invention is designed is described herein as "warm", not "hot", being lower in temperature than the approximately 150 degrees F. maximum supply water temperature recommended for domestic appliances. Second, as is well known in the art of heat-exchangers, the greater the temperature difference between any two substances separated only by a heat conducting medium, the higher is the rate of heat transfer between them; therefore the amount of heat transferred is a function of time and temperature difference. To take advantage of this law of physics, the cold supply water is injected via the injection means 30 as shown in FIG. 3 so that the cold supply water remains for as long as possible in contact with that portion of the outer surface of the wall of the waste liquid transmission pipe nearest to the flow of warm waste liquid, and so that the temperature difference between the supply water and the waste liquid, and the wall of the waste transmission pipe 34 at all points on such portion of outer wall surface is as great as possible. That is, the coldest supply water is nearest the warmest waste liquid, to effect the greatest rate of heat transfer in the short time available during the flow of waste liquid.

Experiments on the heat recovery and storage device according to this invention have shown that turbulence of the cold supply water entering reservoir 43 can effect the efficient operation of the device, if cold water is forced by the turbulence to mix with the warmed supply water in the upper portion of the reservoir 43. Other positions of cold supply water injection means and warmed supply water tapping means than those shown in FIG. 3 are possible, and since, except during shower usage, a drawing of supply water does not often occur in a residential system contemporaneous with the discharge of warm waste liquid, the mixture, due to subsided convection and turbulence, of supply water temperatures in reservoir 43 reaches an equilibrium of temperature gradient whereby the warmer supply water lies in the upper portion of reservoir 43 and the cooler supply water lies in the lower portion thereof.

Figure 4:
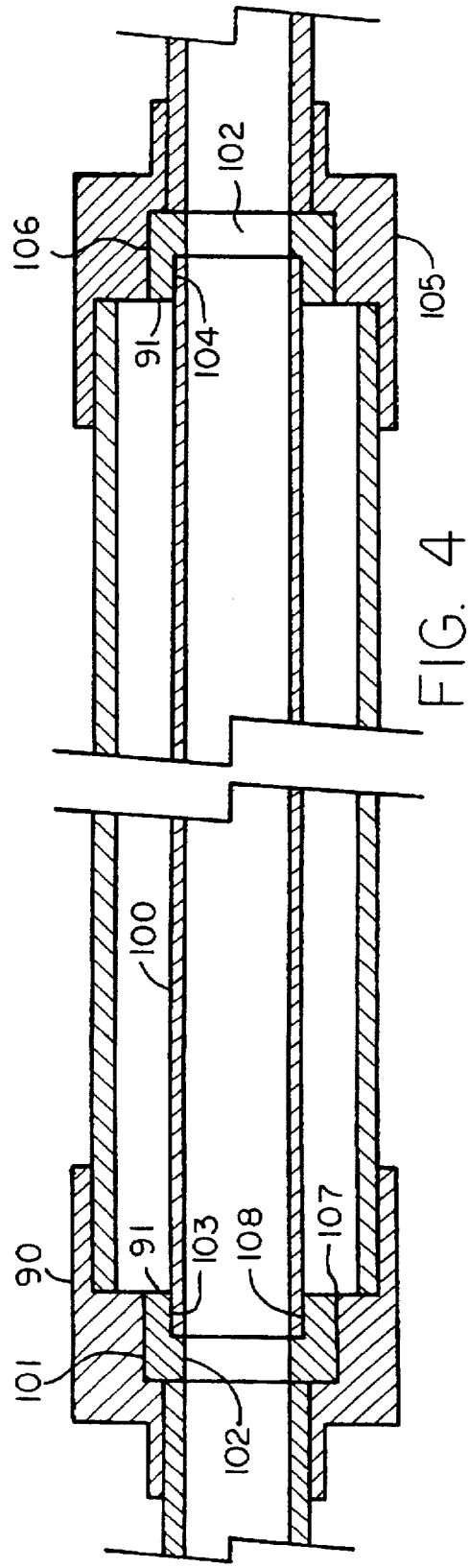
FIG. 4 is a sectional view of FIG. 2 generally as FIG. 3, except that the integral screw threads of FIG. 3 are replaced by flexible stepped bushings arranged between the respective ends of the waste liquid transmission pipe and the internal openings of the endplates.

In FIG. 4 a preferred embodiment of the heat recovery and storage device according to this invention is shown in sectional view similarly to FIG. 3, but wherein the outer circumferential surfaces 103, 104 of the ends of the waste liquid transmission pipe 100 are not threaded. Also the respective circumferential inner surfaces 101 and 106 of the endplates 90 and 105 which receive the outer surfaces 103, 104 of the ends of the waste liquid transmission pipe 100 are without threads. Arranged between, and in contact via flexible sealant layers 107 and 108 with inner surfaces 101, 106 and outer surfaces 103, 104 respectively are annular bushings 91 made of flexible material and stepped to enclose the outer surfaces 103 and 104 and to provide an annular shoulder 102 which separates the respective end of the waste liquid transmission pipe 100 from the end of the waste inlet pipe and waste discharge pipe leading to and from pipe 100 respectively. The purpose of annular bushings 91 is to accommodate the expansion, contraction, and flexing of waste liquid transmission pipe 100 under the intermittency of flow of the warm waste liquid, which could otherwise cause leakage or force the assembly apart. Another function of annular bushings 91 is to permit endplates 90 and 105 to be manufactured of a less flexible material than those in embodiments of this invention employing screw threads or other rigid attachment means for attaching the waste liquid transmission pipe to the respective endplates.

Figure 5:
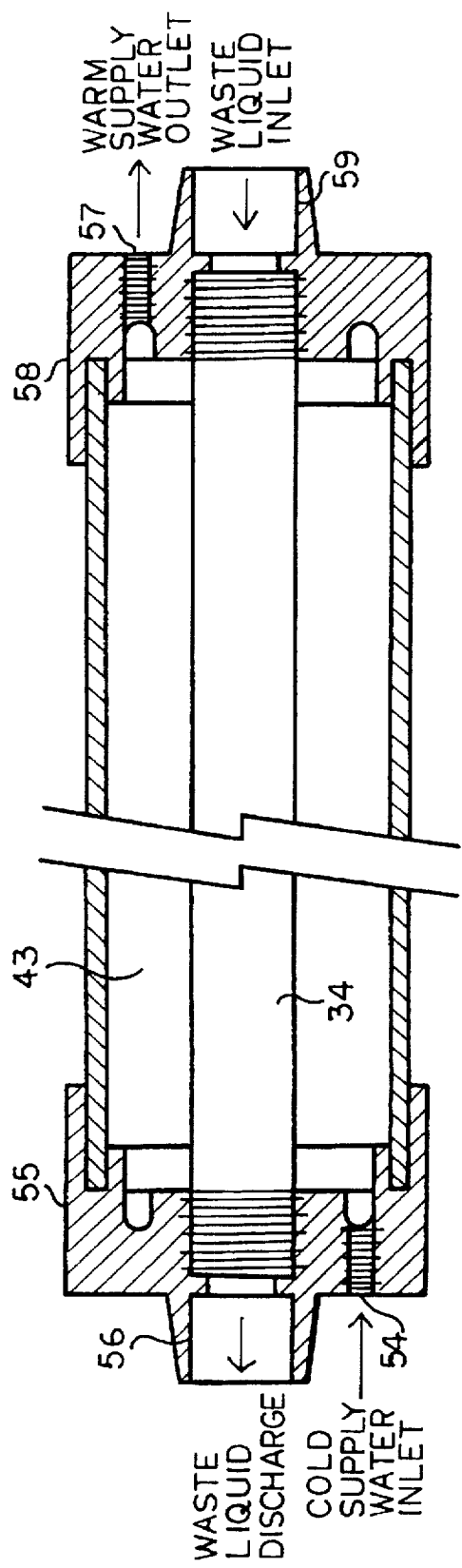
FIG. 5 is a sectional view as in FIG. 3 but showing an embodiment wherein the cool supply water injection means is disposed through the endplate bearing the waste liquid outlet coupling and the warmed supply water tapping means is disposed through the endplate bearing the waste liquid inlet coupling.

In FIG. 5 a preferred embodiment of the heat recovery and storage device according to the present invention is shown in sectional view similarly to FIG. 3 but wherein the cold supply water injection means 54 is disposed through the endplate 55 bearing the waste liquid discharge coupling 56 and the warmed supply water tapping means 57 is disposed through the endplate 58 bearing the waste liquid inlet coupling 59. As the heat recovery and storage device when installed slopes downward from its waste liquid inlet end to its waste liquid outlet end in order to be axially in line with the residence waste liquid outlet 12 and the waste liquid discharge pipe 13 respectively of FIG. 1, which may commonly be at a slope of about 2.5 inches in the approximate ten foot length of the heat recovery and storage device, and because as noted above, the supply water is often static for long periods in the reservoir 43, the warmed supply water migrates to the highest portion of reservoir 43, that is, where warmed supply water tapping means 57 is located in the embodiment shown in FIG. 5. By contrast the colder supply water, having higher density, migrates to the portion of reservoir 43 near the location of the cold supply water injection means 54, and although the waste liquid is at a lower temperature as it approaches the end of the waste liquid transmission pipe 34 near cold supply water injection means 54, due to transfer of heat through the walls of the transmission pipe 34, the rate of heat transfer from the waste liquid at that location is the maximum possible for that waste liquid temperature, because the adjacent supply water is there at its lowest temperature.

Figure 6:
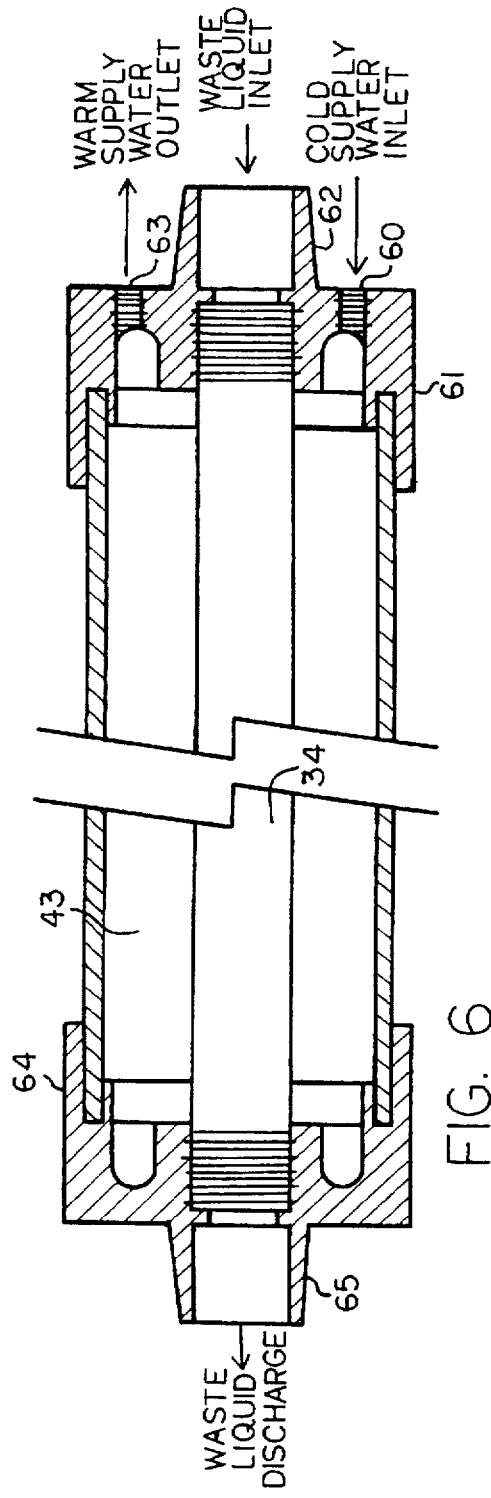
FIG. 6 is a sectional view as in FIG. 3 but showing an embodiment wherein the cool supply water injection means is disposed through the lower portion of the endplate bearing the waste liquid inlet coupling and the warmed supply water tapping means is disposed through the upper portion of the same endplate.

FIG. 6 is a sectional view similar to FIG. 3 but showing an embodiment wherein the cold supply water injection means 60 is disposed through the lower portion of endplate 61 bearing the waste liquid inlet coupling 62 and the warmed supply water tapping means 63 is disposed through the upper portion of the same endplate 61. The position of the warmed supply water tapping means 63 is determined as described above for the embodiment shown in FIG. 5. By contrast, the position of cold supply water injection means 60 is determined as described above for the embodiment shown in FIG. 3. Endplate 64 in FIG. 6 serves to enclose the respective end of supply water reservoir 43 and to bear waste liquid discharge coupling 65.

Figure 7:
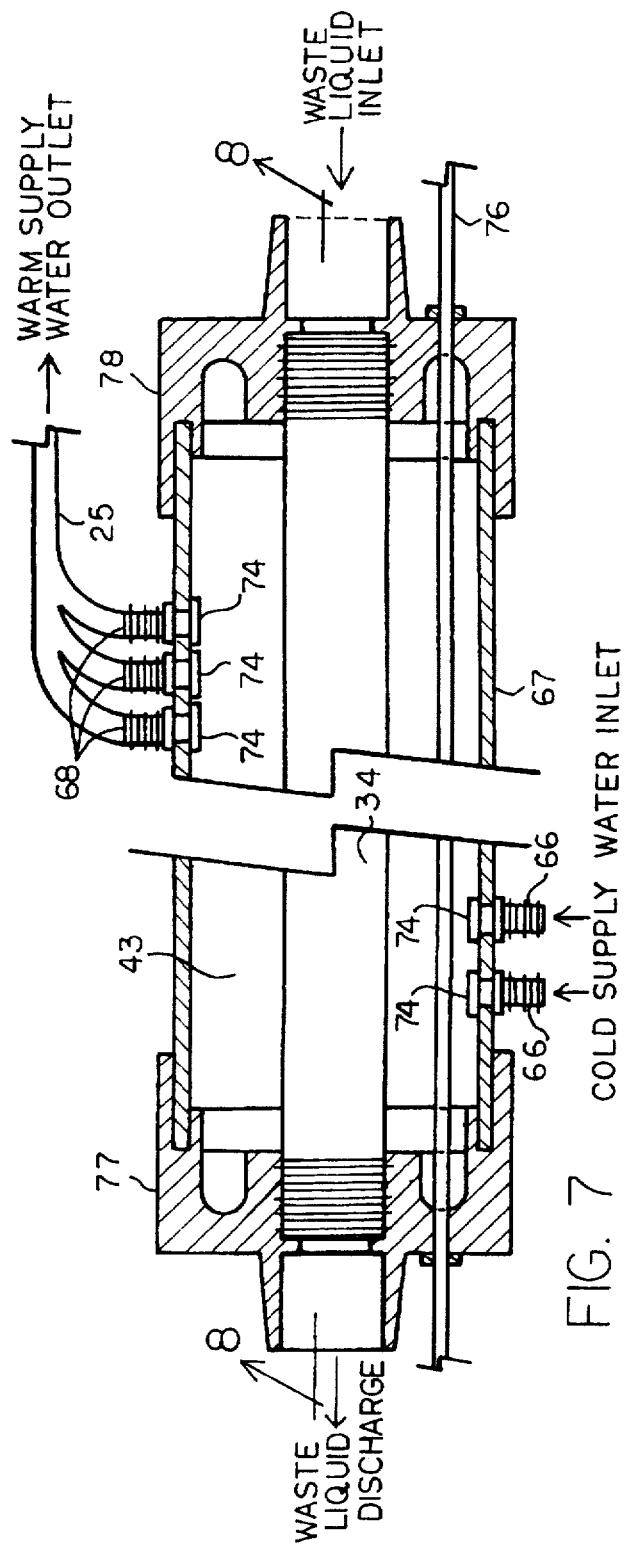
FIG. 7 is a sectional view as in FIG. 3 but showing an embodiment wherein the cool supply water injection means is disposed through the lowest portion of the wall of the supply water reservoir pipe, and wherein the warmed supply water tapping means is a plurality of pipe connections disposed along the uppermost portion of the same wall and centered on a line parallel to the longitudinal axis thereof, and wherein a tube is disposed through the endplates and through the space between the waste liquid transmission pipe and the supply water reservoir pipe, said tube being intended to carry hot fluid from a refrigerant recycling system, such as an airconditioner, from which the heat is available to be recovered into the supply water.

FIG. 7 illustrates an embodiment that has cold supply water injection means 66 disposed normally through the lowermost accessible portion of the wall of supply water reservoir pipe 67, so that the incoming cold supply water is directed at the waste water transmission pipe 34 carrying the warm waste liquid. Warmed supply liquid tapping means in FIG. 7 is a plurality of pipe connections 68 disposed through the uppermost portion of supply water reservoir pipe 67 parallel to the axis thereof for directing the warmed supply water thus tapped into water heater inlet pipe 25 of FIGS. 1 and 7. Experiments on the heat recovery and storage device in this embodiment have shown that the plurality of warmed supply water tapping means 68 extracts about twenty percent more heat carried in the warmed supply water than a single tapping pipe connection as illustrated in FIGS. 3, 4, 5 and 6, because a single tapping, after having drawn an amount of the warmest warmed supply water tends immediately afterwards to draw supply water from portions of reservoir 43 in which the supply water is at lower temperature than that located along the uppermost portion of supply water reservoir pipe 67 extending along reservoir pipe 67 in the direction of downward slope, that is, in the direction of flow of the waste liquid, parallel to axis of reservoir pipe 67, where the plurality of tapping means 68 are disposed. In addition, the plurality of tapping means, rather than a single tapping means permits the warmed supply water to convect more thoroughly to the upper portion of the reservoir 43, by reducing the warmed supply water velocity within reservoir 43, which would otherwise tend to draw cold supply water from the lower portions of reservoir 43. The embodiment shown in FIG. 7 also shows a tube 76 disposed through the endplates 77 and 78 and through supply water reservoir 43, said tube 76 being intended to carry hot fluid from a refrigerant recycling system, such as an airconditioner, from which the heat is required to be extracted. Disposal of such heat is required as part of the function of an airconditioner, for example, and the heat would commonly in residential installations such as that shown in FIG. 1 be dissipated to the atmosphere on its wax to, and by, the condenser and wasted, unless the system's water heater were provided with a separate heat-exchanger designed specifically for recovery of the heat. Leading tube 76 through the heat recovery and storage device of the present invention is an economical means of affecting that heat recovery. The configuration of tube 76 within the heat recovery and storage device of the present invention may be of any type, with or without fins, to present a large heat transfer surface within the water supply reservoir 43.

FIG. 8 is a detailed axial sectional drawing showing an embodiment of the connection means employed for the cold supply water injection means 66 and warm supply water tapping means 68 as shown in FIG. 7 affixed to and passing through the wall of supply water reservoir pipe 67. In FIG. 8, pipe connectors 73 for water heater supply inlet pipe 25 shown in FIGS. 1 and 7 are disposed through holes 75 in supply water reservoir pipe 67. Connections 73 bear integral washers 74 molded to fit the internal cylindrical surface of reservoir pipe 67, so that when pipe-connecting nuts 76 are tightened on connectors 73, connectors 73 cannot rotate in holes 75, but make liquid-tight seals therefor. A similar arrangement is used for the cold supply water injection means 66 shown in FIG. 7.

FIG. 9 illustrates an embodiment of the heat recovery and storage device according to this invention wherein the cold supply water injection means is a pipe 69 inserted through the lower portion of endplate 61 of FIG. 6, said pipe extending substantially the whole length of the supply water reservoir 43 parallel to the axis thereof, having injection holes 70 disposed in a row along its top surface throughout its length and centered parallel both to its axis and that of supply water reservoir pipe 29 and directed at waste liquid transmission pipe 34, and having a closed end 96 proximal to the waste liquid discharge endplate. The injection holes 70 are adapted and arranged to direct the incoming cold supply water into prompt contact with the transmission pipe 34 heated by the waste liquid, but to decelerate and diffuse the flow of injected cold supply water, as compared with the flow of like volume through a single injector, as shown in FIGS. 3, 4, 5, 6, 7, and 8, so that the incoming cold supply water neither temperature-dilutes the warmed supply water that has already migrated to the uppermost part of reservoir 43, nor moves that warmed supply water out of the uppermost portion where the tapping means for warmed supply water is located. That is to say, the arrangement of pipe 69 creates little turbulence to disturb the convection-warming of the supply water in reservoir 43. The embodiment of FIG. 9 is also therein shown with a warmed supply water tapping means disposed also through endplate 61, but through the upper portion thereof as in FIG. 6, said tapping means being a pipe 71, said pipe extending substantially the whole length of the supply water reservoir 43 parallel to the axis thereof, having a plurality of tapping holes 72 disposed in two rows, centered parallel to its axis and to that of supply water reservoir pipe 29 and disposed both through the upper quadrant of the side of tapping means 71 visible in FIG. 9, and through the upper quadrant of the opposite side of tapping means 71, as shown in the sectional view of FIG. 18, and having a closed end 98 proximal to the waste liquid discharge endplate. Tapping means 71 as shown in FIG. 9 is an alternative means of achieving the more efficient effect of the plurality of tapping means 68 described above and as illustrated in FIGS. 7 and 8, but may be a less expensive arrangement to manufacture and install, as the arrangement in FIG. 9 is disposed through endplate 61, in contrast to the plurality of tapping connections 68 shown in FIGS. 7 and 8, which require multiple separate holes through, and liquid-tight connections to, supply water reservoir pipe 43. Also shown in FIG. 9 is radial pipe support frame 95, shown in greater detail view in the section view of FIG. 18, taken on the line 18—18 of FIG. 9. Radial pipe support frames 95, a plurality of which are installed along the approximate conventional ten foot length of supply water reservoir 43 are arranged to support the supply water injection and tapping pipes 69 and 71 respectively, and the waste liquid transmission pipe 34 radially against the internal wall of supply water reservoir pipe 29, so as to minimize sagging and flexing and other asymmetrical movement of the internal pipes under weight and the expansion and contraction caused by the intermittent flows of supply water and warm waste liquid, which might otherwise affect the liquid-tightness of the sealed joints of the device.

FIG. 10 is an axial sectional view of an alternative embodiment of the present invention comprising, in place of the waste liquid transmission pipe of FIGS. 3 through 9, waste liquid transmission pipe 83 in which the outside surface of the waste liquid transmission pipe excluding the portions inserted in endplates 61 and 64 is arranged with integral additional heat recovery surfaces 77 below the level of said pipe's centerline and directed axially to the pipe 83. FIG. 11 is a cross-sectional view further illustrating the arrangement of the additional heat recovery surfaces 77. The object of additional heat recovery surfaces 77 is to increase the area of heat transfer surface of the waste liquid transmission pipe so that the heat from flows of waste liquid may be more quickly and thoroughly transferred, in the short flow time available, into the supply water in reservoir 43. In contrast to Crump the additional heat recovery surfaces 77 do not control the direction of flow of the supply water in reservoir 43, but allow the supply water while being warmed to convect around the waste liquid transmission pipe 83 into the upper portions of reservoir 43, the means described herein of encouraging such convection being a particularly novel feature of the heat recovery and storage device according to this present invention.

FIGS. 12 and 13 respectively show an axial sectional view, and a cross-sectional view, of an embodiment of this invention in which the waste liquid transmission pipe has a lower longitudinal half portion 78 of the waste liquid transmission pipe wall made of high-thermal-conductivity material to transfer efficiently heat from the waste liquid, which as noted above rarely fills more than half of the transmission pipe, while the remaining upper longitudinal half portion 79, axially affixed in liquid-tight fashion to the lower portion 78, is made of low-thermal-conductivity material such as thermoplastic, so that the heat already transferred to the warmed supply water that has migrated to the upper part of reservoir 43 shown in FIGS. 3 through 9 does not become retransferred back into the void 80 of the waste liquid transmission pipe as shown in FIG. 13, which may, between flows of waste liquid become cool. A further benefit of the low-thermal-conductivity material of the upper portion 79 is that significant heat is not conducted back from the warmed supply water in upper portion 79 through its wall to the cold supply water in lower portion 78.

Figure 14:
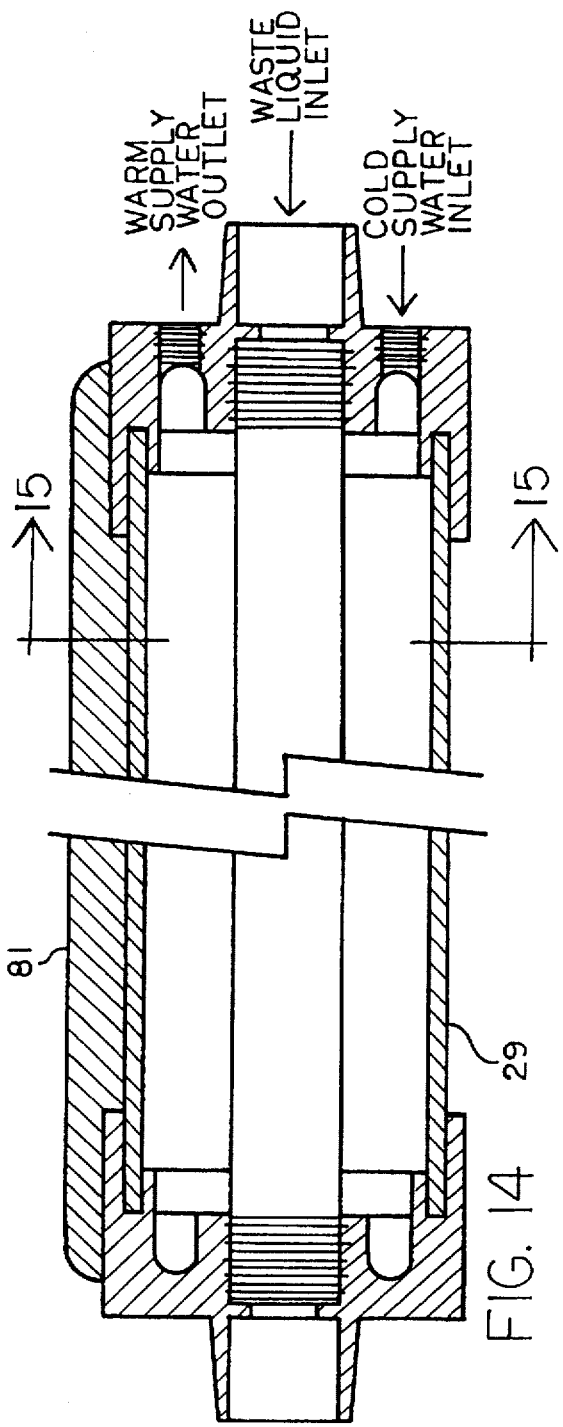
FIG. 14 is a sectional view as in FIG. 3 but showing an embodiment in which the heat recovery and storage device according to this invention has heat insulation wrapped or otherwise applied to the outside of the supply water reservoir pipe.
Figure 15:
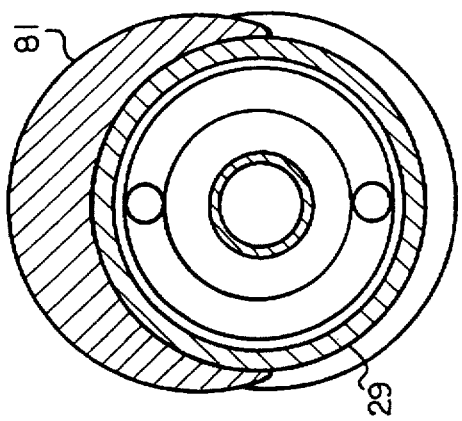
FIG. 15 is a transverse cross-sectional view of the embodiment shown in FIG. 14, taken on the line 15—15.

FIGS. 14 and 15 respectively show an axial sectional view, and a cross-sectional view, of an embodiment in which the heat recovery and storage device according to this invention is arranged with a layer of insulation 81 applied to the upper half of the external surface of supply water reservoir pipe 29 to reduce the escape of heat from the warmed supply water which is intended to enter the water heater 14 of FIG. 1 as warm as possible. The insulation may, as shown in FIG. 15, where the heat recovery and storage device is installed in an area of ambient temperature between that of the cold supply water and the warm waste water, such as in a heated basement, be only on the upper part of the device, where the warmed supply water has migrated, so that ambient heat may advantageously be transferred through the lower portion of the wall of reservoir pipe 29 to the cold supply water. However, a benefit of insulation applied to the exterior of the lower portion of reservoir pipe 29, where the cold supply water is injected, is that condensation on the exterior will be avoided, since the cold portion of the exterior 29 would not then be in direct contact with the warmer surrounding atmosphere.

FIG. 16 shows a partial axial cross section of a preferred embodiment according to this present invention as shown in greater detail in FIG. 3, but gives the full elongated view approximating the form of the invention as applicable to residential installations, and showing a plurality of radial pipe support frames 92 arranged normal to the axis of waste liquid transmission pipe 34 on the outer circumferential surface of pipe 34, supporting pipe 34 on the internal circumferential surface of supply water reservoir pipe 29. The support provided by radial pipe support frames 92 is desirable to provide for symmetrical movement of waste liquid transmission pipe 34 and supply water reservoir pipe 29, thus avoiding any consequent asymmetrical pressure on the liquid-tight joints within endplates 28 and 31. An exemplary support frame 92 is shown in detail in FIG. 17, which is a transverse cross section of a support frame 92 of FIG. 16, taken on line 17—17. In FIG. 17 element 32 is the warm supply water tapping port shown in FIG. 3.

FIG. 18 shows a pipe support frame 95 similar in function to that shown in FIG. 17, but adapted to accommodate the full length supply water injection and tapping means shown in FIG. 9 and described above. In FIG. 18, element 69 is the cold supply water injection means of FIG. 9, passing through and supported by injection pipe support 97, and element 71 is the warm supply water tapping pipe of FIG. 9, passing through and supported by tapping pipe support 99.

FIGS. 2, 3, and 5 through 9 show various particular modes of cold supply water injection and warm water tapping means, and FIGS. 4 and 10 through 18 show various modes of construction in order to indicate, together with this written description, to those skilled in the art the various ways in which the heat recovery and storage device according to this invention may be constructed so that the object of this invention, that is, the recovery of heat that is almost universally wasted may be achieved. Any and all combinations of such modes are intended to fall within the scope of this invention, as particularly set forth in the appended claims. Furthermore, the foregoing description of the invention has been directed primarily to a particular preferred embodiment in accordance with the applicable statutes and for the purposes of explanation and illustration. It will be apparent, however, to those skilled in the art that modifications and changes in the specifically described apparatus may be made within the scope and true spirit of the invention in addition to alternative versions of the preferred embodiment described above. It is the applicants' intention in the following claims to cover such modifications and changes.

What is claimed is:

1. A heat recovery and storage system for transferring heat from intermittently outgoing waste liquid to incoming supply water for a hot-water-using system, the hot-water-using system being of the type having a downward-inclined but near horizontal outgoing waste liquid pipe consisting of an inlet pipe leading into a heat recovery and storage device and a discharge pipe leading from the heat recovery and storage device to a waste liquid disposal means, the improvement comprising:

a straight linear form waste liquid transmission pipe made of high-thermal-conductivity material, having a downward-inclined but near horizontal axis, a proximal planar end for coupling to the waste liquid inlet pipe and a distal planar end, both ends being planar normal to the axis of the waste liquid transmission pipe, and being congruent in cross section to the waste liquid inlet and discharge pipes;

a straight linear form supply water reservoir pipe made of low-thermal-conductivity plastic material, having a larger internal cross section than the external cross section of the waste liquid transmission pipe, disposed around and on the same axis as the waste liquid transmission pipe, and having two planar ends normal to the axis, and a wall, for forming the longitudinal outer casing of a supply water reservoir;

two liquid-tight endplates made of low-conductivity plastic material, one of said endplates being affixed to each end of the water supply reservoir pipe normal to its axis and to each respective end of the waste liquid transmission pipe and extending between the water supply reservoir pipe and the external surface of the waste liquid transmission pipe, to maintain and enclose in pressured-liquid-tight fashion the space between the waste liquid transmission and supply water reservoir pipes as a supply water reservoir;

a coupling means formed in liquid-tight fashion in the endplate at the proximal end of the device for coupling the proximal end of the waste liquid transmission pipe in line with the end of the waste liquid inlet pipe, said pipes having the same axis;

a further coupling means formed in liquid-tight fashion in the endplate at the distal end of the device for coupling the distal end of the waste liquid transmission pipe in line with the waste liquid discharge pipe, the pipes having the same axis;

a supply water injection means for injecting cold supply water into the supply water reservoir, the injection means being located in the lower portion of the reservoir pipe; and a supply water tapping means for extracting warmed supply water from the supply water reservoir, the tapping means being located in the upper portion of the reservoir.

2. A system as claimed in claim 1, wherein each of the coupling means is made integral with its respective endplate, and has an integral internal annular shoulder having an inward and an outward planar side both normal to its axis, the inward side to receive a butting end of the waste liquid transmission pipe, and the outward side to receive the respective butting planar end of the waste liquid outlet pipe of the system.

3. A system as claimed in claim 2 in which each end of the waste liquid transmission pipe is externally threaded and screwed into a corresponding thread in the respective endplate, the threads being further sealed in pressured-liquid-tight fashion by a conventional flexible permanent sealant.

4. A system as claimed in claim 3 in which each respective end of the supply water reservoir pipe is affixed in pressured-liquid-tight fashion into the corresponding endplate, the endplates each having an axially-directed annular circumferential groove into and against the base of which the corresponding end of the supply water reservoir pipe fits when the ends of the waste liquid transmission pipe butt against the internal shoulders of the respective endplates, the ends of the supply water reservoir pipe being further sealed in the grooves by conventional adhesive.

5. A system as claimed in claim 4 in which the endplates are manufactured of a flexible material to accommodate thermal expansion and contraction.

6. A system as claimed in claim 1 further comprising:

a stepped flexible annular bushing having an annular shoulder normal to its axis in contact on the opposing planar faces thereof with the butting end of the waste inlet pipe and the respective butting end of the waste liquid transmission pipe, and having an inner and an outer circumferential surface, the inner surface being affixed by adhesive in pressured-liquid-tight fashion to the external surface of the end of the waste liquid transmission pipe, and the outer surface being affixed by adhesive in pressured-liquid-tight fashion to the internal circumference of the respective endplate, for accommodating thermal expansion and contraction of the waste liquid transmission pipe, and still further comprising:

a further stepped flexible annular bushing having an annular shoulder normal to its axis in contact on the opposing planar faces thereof with the butting end of the waste discharge pipe and the respective butting end of the waste liquid transmission pipe, and having an inner and an outer circumferential surface, the inner surface being affixed by adhesive in pressured-liquid-tight fashion to the external surface of the end of the waste liquid transmission pipe, and the outer surface being affixed by adhesive in pressured-liquid-tight fashion to the internal circumference of the respective endplate, for accommodating thermal expansion and contraction of the waste liquid transmission pipe.

7. A system as claimed in claim 4 in which the supply water tapping means is arranged through the endplate proximal to the waste liquid discharge pipe, and the supply water injection means is arranged through the endplate proximal to the waste liquid inlet.

8. A system as claimed in claim 4 in which the supply water injection means is arranged through the endplate proximal to the waste liquid discharge pipe, and the supply water tapping means is arranged through the endplate proximal to the waste liquid inlet.

9. A system as claimed in claim 4 in which the supply water injection means and the supply water tapping means are both arranged through the endplate proximal to the waste liquid inlet.

10. A system as claimed in claim 4 in which the supply water injection means are arranged through a plurality of connectors aligned axially along and through the lowest portion of the wall of the supply water reservoir pipe and the supply water tapping means are arranged through a plurality of connectors aligned axially along and through the uppermost portion of the wall of the supply water reservoir pipe.

11. A system as claimed in claim 10 in which each of the connectors comprises a washer molded to fit the shape of, and arranged against, the internal surface of the wall of the supply water reservoir pipe and having a centrally positioned axial hole, a short externally threaded pipe of internal diameter of that of the hole, the pipe being affixed to the washer in line with the axis of the hole, the pipe being arranged through the wall, and a nut screwed on to the threaded portion of the pipe for tightening the washer against the interior of the wall.

12. A system as claimed in claim 4 in which the cold supply water injection means is a pipe having a plurality of injection holes along its uppermost surface parallel to the axis of the pipe arranged through the endplate proximal to the waste liquid inlet and extending along the lower portion of the supply water reservoir pipe parallel to the axis thereof, and having a closed end proximal to the waste liquid discharge, and in which the warm supply water tapping means is a pipe having a plurality of tapping holes disposed along the upper portions of the upper quadrants of its external surface in two rows parallel to its axis, arranged through the endplate proximal to the waste liquid inlet and extending along the lower portion of the supply water reservoir pipe parallel to the axis thereof, and having a closed end proximal to the waste liquid discharge.

13. A system as claimed in claim 4 in which the waste liquid transmission pipe has additional heat recovery surfaces arranged on its lower external surface, for improving heat recovery into the supply water reservoir.

14. A system as claimed in claim 4 in which the waste liquid transmission pipe is constructed in two longitudinal portions, that is to say an upper longitudinal hale portion made of low-thermal-conductivity material, axially affixed in liquid-tight fashion to a lower longitudinal half portion made of high-thermal-conductivity material, for reducing back-conduction of heat and improving heat recovery respectively.

15. A system as claimed in claim 4 comprising also a layer of insulation applied to the upper half of the external surface of the supply water reservoir pipe, to reduce conduction from the supply water reservoir pipe to the atmosphere.

16. A system as claimed in claim 4 comprising also a tube made of high-thermal-conductivity material disposed in liquid-tight fashion through the interior of the supply water reservoir pipe, for permitting the recovery of heat into the supply water reservoir from the tube, said tube being the conduit for hot recycled refrigerant.

17. A system as claimed in claim 4 comprising also a plurality of radial pipe support frames bearing on the circumference of the internal surface of and normal to the axis of the supply water reservoir pipe, the frames comprising individual pipe supports circumferentially supporting the waste liquid transmission pipe and the supply water injection and tapping pipes, for reducing sagging and flexing and other asymmetrical movement of the respective pipes.

18. A system as claimed in claim 4 in which the waste liquid transmission pipe is made of copper, and the supply water reservoir pipe is made of thermoplastic.

19. A heat recovery and storage device for transferring heat from intermittently outgoing waste liquid to incoming supply water for a hot-water-using system, the system being of the type having a downward-inclined outgoing waste liquid pipe consisting of an inlet pipe leading into the device and a discharge pipe leading from the device to a waste liquid disposal means, the device comprising:

a straight linear form waste liquid transmission pipe made of high-thermal-conductivity material, having an axis, a proximal planar end for coupling to the waste liquid inlet pipe and a distal planar end, both ends being planar normal to the axis of the waste liquid transmission pipe, and being congruent in cross section to the waste liquid inlet and discharge pipes;

external threaded portions disposed at each end of the waste liquid transmission pipe;

a straight linear form supply water reservoir pipe made of low-thermal-conductivity material, having a larger internal cross section than the external cross section of the waste liquid transmission pipe, disposed around and on the same axis as the waste liquid transmission pipe, and having two planar ends normal to the axis, and a wall, for forming the longitudinal outer casing of a supply water reservoir;

two liquid-tight endplates made of flexible material, one of said endplates being affixed to each end of the water supply reservoir pipe normal to its axis, each endplate having a central hole, the hole containing a female axial threaded portion screwed on to the external thread of the respective end of the waste liquid transmission pipe and an internal axial annular shoulder for positioning the respective end of the waste transmission pipe, and extending between the water supply reservoir pipe and the external surface of the waste liquid transmission pipe, to maintain and enclose in pressured-liquid-tight fashion the space between the waste liquid transmission and supply water reservoir pipes as a supply water reservoir;

a coupling of standard pipe coupling type and dimensions made integrally in liquid tight fashion centrally with the endplate at the proximal end of the device for coupling the proximal end of the waste liquid transmission pipe in line with the end of the waste liquid inlet pipe, said pipes having the same axis and so arranged that when coupled each respective pipe butts flush against the internal annular shoulder of the endplate;

a further coupling of standard pipe coupling type and dimensions made integrally in liquid-tight fashion centrally with the endplate at the distal end of the device for coupling the distal end of the waste liquid transmission pipe in line with the waste liquid discharge pipe, the pipes having the same axis and so arranged that when coupled each respective pipe butts flush against the internal annular shoulder of the endplate;

a pipe for injecting cold supply water into the supply water reservoir, the pipe having a plurality of injection holes along its uppermost surface parallel to the axis of the pipe, being arranged through the endplate proximal to the waste liquid inlet, extending along the lower portion of the supply water reservoir pipe parallel to the axis thereof, and having a closed end proximal to the waste liquid discharge;

a pipe for extracting warmed supply water from the supply water reservoir, the pipe having a plurality of tapping holes disposed along the upper portions of the upper quadrants of its external surface in two rows parallel to its axis, being arranged through the endplate proximal to the waste liquid inlet, extending along the lower portion of the supply water reservoir pipe parallel to the axis thereof, and having a closed end proximal to the waste liquid discharge coupling; and a plurality of radial pipe support frames bearing on the circumference of the internal surface of and normal to the axis of the supply water reservoir pipe, the frames comprising individual pipe supports circumferentially supporting the waste liquid transmission pipe and the supply water injection and tapping pipes, for reducing sagging and flexing and other asymmetrical movement of the respective pipes.

20. A heat recovery and storage device for transferring heat from intermittently outgoing waste liquid to incoming supply water for a hot-water-using system, the system being of the type having a downward-inclined outgoing waste liquid pipe consisting of an inlet pipe leading into the device and a discharge pipe leading from the device to a waste liquid disposal means, the device comprising:

a straight linear form waste liquid transmission pipe made of high-thermal-conductivity material, having an axis, a proximal planar end for coupling to the waste liquid inlet pipe and a distal planar end, both ends being planar normal to the axis of the waste liquid transmission pipe, and being congruent in cross section to the waste liquid inlet and discharge pipes;

a straight linear form supply water reservoir pipe made of low-thermal-conductivity material, having a larger internal cross section than the external cross section of the waste liquid transmission pipe, disposed around and on the same axis as the waste liquid transmission pipe, and having two planar ends normal to the axis, and a wall, for forming the longitudinal outer casing of a supply water reservoir;

two liquid-tight endplates, one of said endplates being affixed to each end of the water supply reservoir pipe and normal to its axis, each endplate having a central hole with an internal circumference and extending between the water supply reservoir pipe and the external surface of the waste liquid transmission pipe, to maintain and enclose in pressured-liquid-tight fashion the space between the waste liquid transmission and supply water reservoir pipes as a supply water reservoir;

a stepped flexible annular bushing having an annular shoulder normal to its axis in contact on the opposing planar faces thereof with the butting end of the waste inlet pipe and the respective butting end of the waste liquid transmission pipe, and having an inner and an outer circumferential surface, the inner surface being affixed by adhesive in pressured-liquid-tight fashion to the external surface of the end of the waste liquid transmission pipe, and the outer surface being affixed by adhesive in pressured-liquid-tight fashion to the internal circumference of the respective endplate, for accommodating thermal expansion and contraction of the waste liquid transmission pipe;

a further stepped flexible annular bushing having an annular shoulder normal to its axis in contact on the opposing planar faces thereof with the butting end of the waste liquid discharge pipe and the respective butting end of the waste liquid transmission pipe, and having an inner and an outer circumferential surface, the inner surface being affixed by adhesive in pressured-liquid-tight fashion to the external surface of the end of the waste liquid transmission pipe, and the outer surface being affixed by adhesive in pressured-liquid-tight fashion to the internal circumference of the respective endplate, for accommodating thermal expansion and contraction of the waste liquid transmission pipe;

a coupling of standard pipe coupling type and dimensions made integrally in liquid tight fashion centrally with the endplate at the proximal end of the device for coupling the proximal end of the waste liquid transmission pipe in line with the end of the waste liquid inlet pipe, said pipes having the same axis and so arranged that when coupled each respective pipe butts flush against the internal annular shoulder of the endplate;

a further coupling of standard pipe coupling type and dimensions made integrally in liquid-tight fashion centrally with the endplate at the distal end of the device for coupling the distal end of the waste liquid transmission pipe in line with the waste liquid discharge pipe, the pipes having the same axis and so arranged that when coupled each respective pipe butts flush against the internal annular shoulder of the endplate;

a pipe for injecting cold supply water into the supply water reservoir, the pipe having a plurality of injection holes along its uppermost surface parallel to the axis of the pipe, being arranged through the endplate proximal to the waste liquid inlet, extending along the lower portion of the supply water reservoir pipe parallel to the axis thereof, and having a closed end proximal to the waste liquid discharge;

a pipe for extracting warmed supply water from the supply water reservoir, the pipe having a plurality of tapping holes disposed along the upper portions of the upper quadrants of its external surface in two rows parallel to its axis, being arranged through the endplate proximal to the waste liquid inlet, extending along the lower portion of the supply water reservoir pipe parallel to the axis thereof, and having a closed end proximal to the waste liquid discharge coupling; and a plurality of radial pipe support frames bearing on the circumference of the internal surface of and normal to the axis of the supply water reservoir pipe, the frames comprising individual pipe supports circumferentially supporting the waste liquid transmission pipe and the supply water injection and tapping pipes, for reducing sagging and flexing and other asymmetrical movement of the respective pipes.

21. A heat recovery and storage system for transferring heat from intermittently outgoing waste liquid to incoming supply water for a hot-water-using system, the hot-water-using system being of the type having a downward-inclined but near horizontal outgoing waste liquid pipe consisting of an inlet pipe leading into a heat recovery and storage device and a discharge pipe leading from the heat recovery and storage device to a waste liquid disposal means, the improvement comprising:

a straight linear form waste liquid transmission pipe made of high-thermal-conductivity material, having a downward-inclined but near horizontal axis, a proximal planar end for coupling to the waste liquid inlet pipe and a distal planar end, both ends being planar normal to the axis of the waste liquid transmission pipe, and being congruent in cross section to the waste liquid inlet and discharge pipes;

a straight linear form supply water reservoir pipe made of low-thermal-conductivity plastic material, having a larger internal cross section than the external cross section of the waste liquid transmission pipe, disposed around and on the same axis as the waste liquid transmission pipe, and having two planar ends normal to the axis, and a wall, for forming the longitudinal outer casing of a supply water reservoir;

two liquid-tight endplates, one of said endplates being affixed to each end of the water supply reservoir pipe normal to its axis and to each respective end of the waste liquid transmission pipe and extending between the water supply reservoir pipe and the external surface of the waste liquid transmission pipe, to maintain and enclose in pressured-liquid-tight fashion the space between the waste liquid transmission and supply water reservoir pipes as a supply water reservoir;

a coupling means affixed in liquid-tight fashion to the endplate at the proximal end of the device for coupling the proximal end of the waste liquid transmission pipe in line with the end of the waste liquid inlet pipe, said pipes having the same axis;

a further coupling means affixed in liquid-tight fashion to the endplate at the distal end of the device for coupling the distal end of the waste liquid transmission pipe in line with the waste liquid discharge pipe, the pipes having the same axis;

a supply water injection means for injecting cold supply water into the supply water reservoir, the injection means being located in the lower portion of the reservoir pipe; and a supply water tapping means comprising a plurality of tapping holes for extracting warmed supply water from the supply water reservoir, the tapping means being located in the upper portion of the reservoir.

* * * * *